United States Patent [19]
Moslares

[11] Patent Number: 5,991,732
[45] Date of Patent: Nov. 23, 1999

[54] STRATEGICAL-TACTICAL LOGISTIC SYSTEM

[76] Inventor: Andres Monedero Moslares, Via Augusta 59, Dpcho. 705, Barcelona, Spain

[21] Appl. No.: 08/411,383

[22] Filed: Mar. 27, 1995

Related U.S. Application Data

[63] Continuation of application No. 07/972,774, Dec. 11, 1992, abandoned, which is a continuation-in-part of application No. 07/708,074, May 24, 1991, abandoned, which is a continuation of application No. 07/311,635, Feb. 15, 1989, abandoned.

[51] Int. Cl.⁶ ................................................. G06F 17/60
[52] U.S. Cl. .................... 705/8; 364/468.05; 364/468.13
[58] Field of Search .................................. 364/400, 401, 364/403, 408, 468, 468.05, 468.07, 468.13, 468.14; 395/222, 223, 228, 229, 207; 285/55; 705/7, 8, 10

[56] References Cited

U.S. PATENT DOCUMENTS

| | | | |
|---|---|---|---|
| 4,459,663 | 7/1984 | Dye | 364/468.07 |
| 4,646,238 | 2/1987 | Carlson, Jr. et al. | 364/403 |
| 4,648,023 | 3/1987 | Powell | 364/468.07 |
| 4,852,001 | 7/1989 | Tsushima et al. | 364/401 |
| 4,887,206 | 12/1989 | Natarajan | 364/401 |
| 4,887,207 | 12/1989 | Natarajan | 364/401 |
| 5,089,970 | 2/1992 | Lee et al. | 364/468 |
| 5,101,352 | 3/1992 | Rombort | 364/401 |
| 5,128,860 | 7/1992 | Chapman | 364/401 |
| 5,128,861 | 7/1992 | Kagami et al. | 364/403 |
| 5,148,370 | 9/1992 | Lilt et al. | 364/468 |
| 5,193,065 | 3/1993 | Guerindon et al. | 364/468.13 |
| 5,195,041 | 3/1993 | George et al. | 364/468 |
| 5,233,533 | 8/1993 | Edstrom et al. | 364/468.09 |
| 5,255,181 | 10/1993 | Chapman et al. | 364/401 |
| 5,268,838 | 12/1993 | Ito | 364/401 R |
| 5,278,750 | 1/1994 | Kaneko et al. | 364/401 |
| 5,287,267 | 2/1994 | Jayaramana et al. | 364/403 |
| 5,289,370 | 2/1994 | Lirov | 364/401 R |
| 5,299,115 | 3/1994 | Fields et al. | 364/401 R |
| 5,440,480 | 8/1995 | Costanza | 364/401 |
| 5,446,890 | 8/1995 | Renslo et al. | 707/104 |
| 5,771,172 | 6/1998 | Yamamoto et al. | 364/468.13 |

OTHER PUBLICATIONS

Charles J. Cavallaro, "New Para Research MRP II System Adapts Itself to Your Business", Para Research, Aug. 13, 1985.

Horwitt, "Mattel Net Chases Xmas Blues", Computerworld, p. 8, Dec. 19, 1988.

Anonymous, "MSA Instroduces New Mainframe Systems: Sales Forecasting and Distribution Resource Planning", The Software Company Management Science America, Sep. 23, 1985.

Dauohinais, "Taking Inventory with INMASS", PC Magazine, p. 272, Jun. 26, 1984.

*Primary Examiner*—Edward R. Cosimano
*Attorney, Agent, or Firm*—Irah H. Donner; Pepper Hamilton LLP

[57] ABSTRACT

A method for using a computer to control the manufacture of items in a factory determines when to schedule the manufacture of a new batch of an item or the ordering of a new batch from an outside supplier by comparing an item's reaction capacity with a limit above which the reaction capacity should lie. The limits are computed, on the basis of sales forecasts and bill of materials information, to be limits adequate to meet the forecast need for commercial items produced by the factory. The reaction capacity is recomputed and compared with the limit at a plurality of control dates. In computing an item's reaction capacity, the physical inventory, the pending orders for additional supplies of the item, the unfulfilled customer demand for the item, and the demand for the item from within the factory are all taken into account.

27 Claims, 21 Drawing Sheets

HIERARCHICAL STRUCTURE BY LEVELS OF THE ITEMS ASSOCIATED TO PRODUCT TREES

HIERARCHICAL GLOBAL STRUCTURE BY LEVELS OF ALL THE ITEMS OF THE PRODUCTION ENVIRONMENT

PARAMETRIZATION OF THE TIME CONCEPT

BEING:
   $SP_i$ = CONTRASTING DATA (FROM THE STARTING POINT i=0)
   $[SP_i]$ = OPERATIVE SYSTEM PERIOD

UPDATING RECEIVED AND/OR DELIVERED CUSTOMER'S ORDERS

UPDATING LAUNCHED SUPPLYING PROCESS

CURRENT INTERNAL DEMAND

OPERATIVE SUPPLYING PROCESSES' PROPOSALS

STRATEGICAL-TACTICAL LOGISTIC SYSTEM

RELATED APPLICATIONS

This is a continuation of application Ser. No. 07/972,774 filed Dec. 11, 1992, now abandoned, which is a continuation in part of Ser. No. 07/708,074 filed May 24, 1991, now abandoned, which is a continuation of Ser. No. 07/311,635 filed Feb. 15, 1989, now abandoned.

BACKGROUND OF THE INVENTION

1. Field of the Invention

This invention relates to an apparatus and/or method for using a computer for determining forecasted inventory replacement orders for serving a plurality of forecasted and continuous demands.

2. Prior Art

Over the past decades, there has been a growing interest in the way companies control their resources including materials, warehouse, machinery, inventory, etc., in order for the companies to improve their service to clients, reduce their costs and make the most of their resources. Indeed, a number of computer controlled systems have been developed for modeling and supporting the control of these resources. These methods include Material Replacement Planning (MRP) (see FIGS. 1a, 1b); KAN-BAN and Stock Replacement techniques. Although these models are built for many strategic approaches, they may be considered incomplete and/or partial.

The decisions taken with regard to Material Replacement Planning (MRP) in a logistical system such as that described in this specification are simple in theory, but very complex in practice. They are simple in theory because if we accept the fact that the demands to be met by the system are precisely the forecasted ones, and that the time taken by the replacement orders is also the expected time, we need only set up a Gantt chart for each demand forecast, obtaining through the bill of materials for the item for which the demand is forecast, a whole succession of its components, and these (depending on the sequence laid down by the bill of materials itself) may be brought forward in time by their forecasted replacement values. The programmed and forecasted requirements thus obtained for each item, for all the assemblies of which it is a component, gives us the total requirements for this item, as well as the deadlines for launching and/or replacement of the same. These requirements can be grouped (brought forward) by batches or other factors.

In practice, however, this is not as simple as it appears, since the actual demand is not usually the forecasted one and the actual replacement times are not usually the forecasted ones. If at a certain moment we take into account the programming we have forecasted from one point and what has happened until this point was reached, we shall surely find that the quantity to be manufactured or replaced has arrived before it was due to arrive, or has still not arrived, and that besides, this quantity has been manufactured or replaced or is still being processed, and is greater or smaller than what was actually ordered.

It may be necessary, for example, to accelerate the termination of a delayed manufacturing process and/or add the necessary quantities to the batch manufactured to meet a greater demand than that forecasted. Thus, the production rates are distorted and the demands are not met correctly.

No one is in any doubt as to the negative consequences that poor service has on the image of the company in the eyes of the client, or the damaging effects that modifications, accelerations (and therefore delays), parallel manufacturing, etc., have on the use of productive resources, the lengthening of "maturing" periods and also on the generation of stocks. All this without taking into consideration the costly and complex control systems and the decisions necessary for "remedying" the previous situations.

On the other hand, buying and manufacturing each item of the system in relation to its own situation and the future forecasts programmed for it, means that any error in the demand forecasts will be reflected in the purchases or manufactures.

The KAN-BAN techniques, which form part of the "just in time" philosophy, indirectly revealed the defects of the previous approach, and proposed, among other things, that the demand itself should determine the replacement orders and not the forecasts, as in the MRP technique.

This is a principle with which we are in complete agreement, but in our opinion, it is incomplete, since it is only a tactical technique and forecasts are still necessary in order to plan and adapt the production load and capacity. On the other hand, as we understand it, in general, the KAN-BAN techniques are only applicable to certain specific cases and processes within the company. Thus it still remains necessary to coordinate these KAN-BAN processes with the other processes of the company.

The Stock Replacement Method, which is clearly advantageous with regard to simplicity and reaction to the actual demand received (within the environment of foreseen parameters), is still ideal for non-productive processes, but cannot be applied to controlling the replacement of components with erratic demands and in batches, since the method is only suitable for controlling stock replacement within an environment of constant demand.

The systems as described above are incomplete: MRP is based only on strategical forecasts and the KAN-BAN technique is founded only in tactical considerations; or partial: the Stock Replacement technique considers strategical and tactical approaches but it only applies to commercial and/or isolated item replacement.

Therefore, a model or system that takes decisions with regard to replacement orders is still necessary. Forecasts would still be used, but only as a strategical tool, in order to: plan (adapt) the forecasted "load" and "capacity" and also create the necessary strategical conditions for performing the tactical operations in the most advantageous manner—not only for the commercial and/or isolated items but for all the items in a logistical system. As a last resort, a tactical approach should lead to the replacement orders (in certain real-life situations), making it possible to carry this approach out under the most advantageous conditions, thanks to the forecasted strategical environment. All these are the characteristics of the forecasted model and for this it can be advantageously updated.

SUMMARY OF THE INVENTION

The present invention seeks to provide a method and apparatus that reduces or eliminates the disadvantages referred to above in the way also described.

Briefly, a preferred embodiment of the invention includes an apparatus and/or method using a computer for determining forecasted stock replacement orders for a logistical system for serving a plurality of forecasted and continuous external demands. The logistical system forecasts over a predetermined time interval. The time interval is divided into a plurality of equal time periods. The logistical system includes a plurality of hierarchical structures (bills of materials) and each of the structures has a plurality of items. The top level of each structure has one of the items. Each top level or commercial item is associated with one of the forecasted and continuous external demands, and each top level item requires none, one, or more directly associated items for producing the item through a single replacement procedure. These directly associated items are called components when one refers to their structural relation with the item to which they are directly associated. These directly associated items as components are associated with the next lower level of the directly associated item. Additionally, each of these directly associated lower level items as component, requires none, one, or more further lower level directly associated items for producing the item through a single replacement procedure, and so on to the lowest level item in each separate structure (bill of materials). Whenever an item exists in a separate structure, it must contain all its directly associated items as components and thus, all the identical items in all the lower level positions. The level associated with an item as a separate item in the logistical system is the lowest level of all the separate structures (bills of materials) to which it belongs. The items have physical characteristics and associated with each of the items is a replacement procedure. The replacement procedure has a particular time frame and a strategy for maintaining the available inventory and/or replacement orders of the associated item.

A new strategic-tactical process is described for determining the proposals of needed replacement (with regard to time and quantity) of items within a logistical system, so that it would be possible to meet immediately the external demand which is requesting the commercial items of this logistical system and whose time evolution is assumed to be divided into operative periods [PSi]. At the control dates "PSi" which separate the operative periods [PSi], the control and operative actions proposed by the process take place.

Such a process can be described by two principal characteristics. First, the external demand for the commercial items (top level items) of the logistical system is transmitted in a practically transparent form—and, therefore, with the same characteristics and continuity as the external demand—to each and every item of the logistical system. Second, the demand previously received for each item in the logistical system, is met by such items in an individualized and immediate manner through a "strategic environment" constituted by these items, which are generated and replaced by means of known techniques of stock replacement.

Stated differently, the present invention is described as a "strategic environment" where advance replacements are generated, forecasted as necessary, and where through the tactical approach, the demand actually received is met, thanks to the above-mentioned "strategic environment". At the same time these environments are replaced when necessary and in accordance with what is foreseen, and made ready to meet new future demands.

To specify in more detail the previous philosophy, the method or process is defined in the following paragraphs.

An initial assumption is made that each and every one of the items of the logistical system is foreseeably and continuously demanded. Strategic parameters are calculated on the basis of the forecasted demands and the replacement procedures—foreseen for each item—to know when and how much a tactical situation must be replaced. These strategic parameters will be calculated by means of known techniques of stock replacement, as if each item was a separate and independent one from the rest of the items of the logistical system. Such parameters allow one to maintain the tactical situation of each item, i.e. its Reaction Capacity (RC), between maximum (MRC) and minimum (mRC) values. Reaction capacity for an item refers to the item's capacity to react to demand, that is, the portion of the inventory and replacement supplies ordered and not yet received for the item which is available (i.e., not viewed as reserved in the context of the logistical system) to react to demand for the item. This allows the system: 1) to meet, with the help of such "RC", the estimated future demands for the item, and 2) to give time to maintain the previous "RC", between the estimated minimum and maximum values, by means of operative replacements.

Maximum Reaction Capacity (MRC) is the strategical parameter which defines the maximum value of the "RC" that must be reached after each replacement order, when it is made according to the previous strategic parameters, whereby the forecasted demand can be met until the next replacement order (made also according to foreseen rules) can be received.

The present invention proposes that, for items with other directly associated items as components, the progressive evolution, in each time period, of the "RC" of each of these items, from its maximum to its minimum value, resulting from the assumed continuous demand, has to be compensated by reserving the necessary units of these items as components to replenish the "RC" up to the maximum value or "MRC" foreseen for that item in each time period. Therefore, at any "PSi", it should be possible to fulfill, with a new replacement order, the actual "RC" value until it reaches the value of the "MRC" foreseen at this point. There should be enough reserved component items to make this possible. The RC value plus the equivalent value of RC that can be obtained from the reserved component items, are called the "strategical environment" of the item, and have to be equal to the MRC value forecasted for the item in each "PSi".

The present invention defines a concept of demand: internal demand (ID). The "ID" is the demand an item emits as a demand to the items which are its components, if it has any, the value of "ID" being updated in each "PSi". The "ID" can be defined as the difference between the foreseen value of the "MRC" for this item at a PSi, and the remaining value of the "RC" of the item at such point:

ID=MRC−RC.

In more detail, the internal demand that an item emits for the items which are its components at each control date "PSi" is called the internal demand emitted (IDe):

IDe=MRC−RC.

The above-mentioned "IDe" is properly adjusted by the quantity "$r_j$", which expresses the number of units of each component item "j" necessary to obtain a unit of the item, and by the fraction m of bad units of the item which one expects to obtain in each replacement process, giving:

$ID_r = IDe \times r_j \times (1+m)$ where "$ID_r$" is the internal demand received for each component item "j".

The successive increments of the "$ID_r$" value received for an item j when it acts as a component, constitute a new additional demand which must be immediately met by reserving the corresponding units (which will be part, theoretically, of the "strategic environment" of the item which emitted the internal demand).

In this way, the External Demand is virtually transparent. Orders for commercial items of the logistical system are compensated through an equivalent increase in the internal demand that each item emits and receives in the logistical system and, therefore, the initial hypothesis for the strategic parameters is valid for all the items in the logistical system.

In addition to the previously defined strategic proposals, the present invention defines a series of tactical procedures which carry out the actual situations. The Reaction Capacity (RC) expresses the value of the inventory and/or replacement supplies ordered and not yet received for the items, available (not reserved in the context of the logistical system) to attend to their own and forecasted future demands. Analytically:

$$RC = E + RR - PD - ID_r$$

where "E" is the physical inventory, in units, "RR" is the pending Replacement orders, in units, "PD" is the Pending Demand, in units, and "$ID_r$" is the total value of internal demand received from the items at higher levels that have the item being analyzed as a component.

Therefore, the tactical control parameter "RC" expresses for each item the requirements necessary for attending to the forecasted demands, since the reserves of the item "PD", as well as the reserves from the other items "$ID_r$", have been considered and deducted. On the other hand, "RC" will consequently be perfectly comparable with the strategic parameters of the item, since these parameters only consider in each control date "PSi" the values of available inventory and/or replacement orders necessary to meet the forecasted demand of such item. To obtain "RC", the information regarding each item must be updated to reflect the events that, during the period which has just ended, have affected it.

External Demand received from outside of the logistical system must be registered by decreasing the existing inventory "E", if the demand is attended to, or by increasing the value of Pending Demand "PD", if it is not.

Operative replacement orders "RR", launched during the period which has just ended, have to be recorded by increasing the pending Replacement orders: "RR" of the item. When the item has other items as components, each item as component must be reserved by increasing its value of Pending Demand: "PD", with the corresponding units of such item as component necessary to obtain the operative replacement order of the item. This process means: 1) the "RC" of the item will have increased by the value of this new replacement and, consequently, the Internal Demand emitted by the item will be decreased by the above value of the replacement, and 2) the internal demand received and reduced, is substituted, in the respective items which act as components, by its equivalent value in Pending Demand.

The number of replacement units "ER" received from the pending replacement orders which were completed during the period which has just ended, as well as the units "CC" of the items used as components to produce them, are used to carry out the following updates: For each item, the new "E" is equal to the old "E" plus "ER", and the new "RR" is equal to the old "RR" less "ER". For each component item, the new "E" is equal to the old "E" less "CC", and the new "PD" is equal to the old "PD" less "CC".

After the preceding processes have been carried out, the internal demand, emitted and received, must be updated. Internal demand received and emitted by each item in the logistical system has to be updated according to the actual values of "E", "RR", and "PD", obtained at the end of the period which has just ended. This process occurs on a level by level basis from the highest to the lowest level. (The process must be started with all internal demand emitted and received by the items of the logistical system equal to zero.) The process includes the following operations: 1) the new value of the "RC" of each item (which should include, if they are already worked out, the internal demands already received) is compared with the "MRC" which has been estimated for the item at this control date "PSi", thus obtaining the new value of the internal demand emitted by the item at this "PSi", 2) the new value of the internal demand emitted, duly modified by the corresponding relation "$r_j$" and "m", has to be updated by adding this value to the actual value of the Internal Demand received for each item which is a component of the previous item.

As can be seen from the tactical processes described above, the only demands which affect each item in the logistical system are the external and/or internal demands, as the replacement processes only change the status of the previous demand but not its value.

According to the preceding definitions, strategical parameters for forecasting inventory replacement orders for a plurality of forecasted and continuous demands can be calculated by means of the following steps. Each step is performed for each time period of the time interval. In the first step, the forecasted external demand associated with each of the top level items is obtained and the external demand is divided proportionally for each of the time periods of the time interval, recording its value as forecasted demand in the correspondent top level or commercial item and correspondent time periods.

The second step involves calculating for each of the associated top level items, individually, the strategical parameters, i.e., the maximum and minimum value between which the amount of available inventory and/or replacement orders issued and still pending for the item. These parameters must be maintained in order to meet the forecasted demand associated with the item and also according to the replacement procedure associated also with the item, over a plurality of time periods.

Next, for each of the highest level items, the amount of the available inventory and/or replacement orders for an item remaining after the forecasted demand for the item depletes the amount in each of the time periods is calculated.

Then, for each of the highest level items, a forecasted internal demand emitted is determined for the items, if any, associated as components with the highest level item. This step is performed by calculating the variation in the difference between the maximum amount of the available inventory and/or replacement orders of the highest level item and the remaining amount of available inventory and/or replacement orders of the highest level item.

The obtained internal demand emitted, duly modified by the corresponding relations "$r_j$" and "m", will be updated by adding it to the actual forecasted demand (external and/or internal, if any) of each of these items as components.

The next step involves repeating, from the second step, the previous processes with the items associated, as a separated one, with the following levels and in the same fashion up to the lowest level item.

In this way the forecasted strategical parameters of all the items in the logistical system and for each forecasted "$PS_i$" will be obtained.

As a consequence of the above strategical-tactical method, it is possible to assign the most efficient replacement procedures to each item regardless of the types of replacement procedures and situations of the other items in the system.

The immediate updating of the internal demand emitted, or internal reserves of every item, necessary to maintain its replacement potential, allows: 1) every item to know what its status is, once the internal reserves of the rest of the items have been deducted, as it affects the item, 2) every item to know what replacement orders are needed to serve those needs and locate itself according to the strategic forecasted parameters of replacement should be, 3) every item to be able to replace itself, immediately, thanks to its "internal" reserve of necessary items as components, obtained through the Internal Demand previously emitted by the item.

Therefore, all the items in the system react to the actual development of operation automatically and independently, replacing themselves at the appropriate time and quantity necessary to maintain the items and the rest of the system at maximum efficiency. Although an item may not have a reserve to match its demand, the other items would be recovered, independently, so as to satisfy the global needs of the system as well as their own, so that once a break or jam in providing reserves has been solved, the process continues as if nothing had happened.

Both the internal demand, which updates the internal reserve of the necessary items as components to replace the item potentially and the operative replacement proposals, regulate, by differentiating what it is and what should be the demands and operations which have occurred so far.

The individualized and independent replacement of every item can be done by stock replacement techniques with the result of simplifying the pursuit and the control of the replacements, and relaxing the manufacturing requirements in times and quantities of the replacement.

Because the present invention assigns a global time in the manufacturing of replacements, this allows one to consider every manufacturing group or post as if it were a supplier. This implies that the present invention does not get involved with programming the specific jobs for every group or post; but it gives freedom (it gives flexibility) to everyone in charge so that he can better organize their work. The present invention only controls and records the behavior of every "supplier" in order to re-adjust the calculations and harmonize general coordination.

The transparency and autonomy of replacement, which the strategic environment dictates, allow one to assign replacement forms and values individually, with these forms and characteristics of replacement being absolutely independent from the rest of the items in the logistical system.

It is possible to delay, in some cases, the internal reserve of the necessary item as components which form the Strategic Environment of an item until its value reaches a critical point which shows when the launching of these items as components must take place so that they themselves can be "just in time" to request the previous item to manufacture its operative reposition. For example, referring to FIG. 14, in the simple case of an item with other items as components, we find that when the value of the internal demand received "$ID_r$" with which the item "Y" emits to its component "X" reaches the value of the "mRC" of "X", it means that the latter will have to issue the replacement order, which will be received "$A_x$" time periods later. At that point, the item "Y" will have to issue its operative replacement order.

It is possible to incorporate and achieve partial processes of replacement achieved by KAN-BAN techniques. This is possible by eliminating the "structures" employed in the present invention, letting those intermediate items be procured by KAN-BAN techniques, only leaving the higher level items in the process of the invention and the items which act as components of the entry of those items, as well as assigning the replacement time of all the KAN-BAN processes to that higher level item. The present invention will ensure that the items described as components will be available, so that the necessary replacement of the item can be obtained.

The errors in the sales forecasts only affect the size of the Strategic Environment, or replacements, which, initially, must be maintained early with regard to the received demands, since these actual demands are the only ones that "pull" the replacements.

In sum, the present invention enables each item and its associated component items to meet a continuous demand separately. The characteristics of each item and its component items are controlled in an autonomous strategic environment. This permits virtually any type of design for the environment and/or the relationships between the items and/or the component items.

BRIEF DESCRIPTION OF THE DRAWINGS

FIG. 3b shows the hierarchical global structure of the items associated as commercial items and/or components to each Product Tree shown in FIG. 3a;

DETAILED DESCRIPTION OF THE INVENTION

The detailed description of the invention is organized according to the following outline:

A. INTRODUCTION

B. APPROACH TO DETERMINATION OF REPLACEMENT PROPOSALS

C. A DETAILED DISCUSSION OF THE PREFERRED EMBODIMENT
  1. Logistical Environment
  2. Functional Characteristics
  3. Stock Replacement Techniques for Isolated Items
    a. Process of Elementary Control and Replacement
      i. Maximum Reaction Capacity (MRC)
      ii. Reaction Capacity (RC)
      iii. Replacement Proposals
    b. Process of General Control and Replacement
      i. Minimum Reaction Capacity (mRC)
      ii. Maximum Reaction Capacity (MRC)
      iii. Operative Replacement Proposals
  4. Stock Replacements in Hierarchical Structures of Items with Components
    a. Strategical Environment
    b. Internal Demand
    c. Transparency of the External Demand
    d. Operative Replacement Proposals
    e. Operative Replacement Commands
  5. Description of the Data Processing Method for Obtaining Replacement Proposals
    a. Updating Forecast External Demand (FIG. 10a)
    b. Updating Strategic Replacement Parameters (FIG. 10b)
    c. Updating Internal Demand Forecasts (FIG. 10c)

d. Updating to Reflect External Demand (FIG. 11a)
e. Updating to Reflect Replacement Orders Issued (FIG. 11b)
f. Updating to Reflect Completed Replacement Orders (FIG. 11c)
g. Updating Actual Internal Demand (FIG. 12)
h. Calculation of Actual Replacement Proposals (FIG. 13)

E. Alternative Description of the Preferred Embodiment

A. INTRODUCTION

Before describing in detail the present invention, it is necessary to discuss the environmental framework in which the invention is performed. The most important characteristics of the environment which need to be established are the definitions for external demand, logistical system and time period.

In the preferred embodiment, the external demand is forecasted from known sales forecasts. In the preferred embodiment, we will assume that the demand is a continuous one which is predicted by known processes and techniques of forecasting. The demand is expressed in units for each commercial product (or item) for which orders are expected for successive periods of time.

Figure 15:
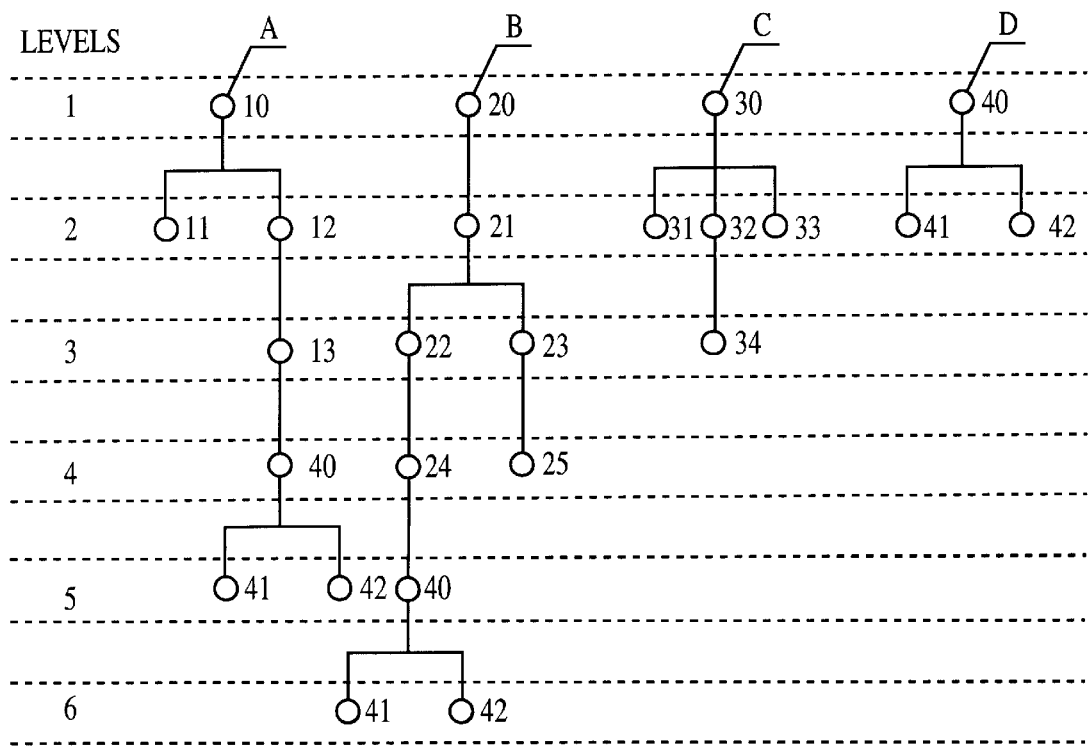
FIG. 15 depicts several hierarchical structures (bills of materials) for four commercial items and their components managed by the logistical system.

The logistical system is considered to be the environment for explaining the relationship between items which make up the commercial items. The logistical system is a series of structures which are assembled in a hierarchical approach (bills of materials). Each hierarchical structure consists of a plurality of levels and at the top level of the hierarchy is the commercial or top level item which is demanded by the continuous and forecasted demand from outside the logistical system. Referring to FIG. 15, an example of a series of four hierarchical structures are shown. The hierarchy is separated into six levels, and the top level or level 1 in each separate structure consists of items 10, 20, 30 and 40 which are externally demanded.

Each item 10, 20, 30 and 40 requires none, one, or more directly associated items of each structure for producing the item through a single replacement procedure. These directly associated items are called components when one refers to their structural relation with the directly associated item for each separate structure. These directly associated component items are associated with the following lower level of the directly associated item for each separate structure: items 11 and 12 are directly associated to item 10 as components for the specific A structure. These items 11 and 12 are associated to level 2 or following lower level of item 10 for the specific A structure. Additionally, each of these directly associated lower level component items requires none, one, or more further lower level directly associated items of the structure for producing the item through a single replacement procedure: item 13 is directly associated to item 12 as component for the specific A structure. This item 13 is associated to level 3 or following level of item 12 for the specific A structure, and so on to the lowest level item in each separate structure.

Note that item 40 and all of its directly associated component items are shown in three different hierarchical structures: A, B, and D. Whenever an item exists in a separate structure, it must contain all its directly associated component items and thus, all the identical items in all the lower level positions. The level associated to an item individually in the logistical system is the lowest level of all the separate structures to which it belongs: the level assigned to item 40 individually is the one corresponding to the lowest level at which the item exists. Because item 40 is found at level 1, level 4 and level 6, the level associated to item 40 individually is the minimum level 6.

Each item, for purposes of the preferred embodiment, is considered to have a single replacement procedure by which it can be obtained either through purchase or manufacture. In this way, a statistical average for the replacement time necessary for obtaining the item c an be calculated. The replacement time is generically labeled as "A". In addition, there are other "operating parameters" for each item which must be taken into account for forecasting and enhancing the coordination of replacement items to meet a particular demand. These operating parameters are dependent on the strategy for determining when replacement orders are launched for the particular item. For example, if an item is subject to the fixed replacement period technique, the necessary quantities of the item are ordered after a fixed period of time. Alternatively, if an item is subject to the operating order point technique, orders are placed when the current inventory is depleted to a specified amount. Each replacement technique affects the availability of the items necessary to meet forecasted or real demands. Thus, the type of replacement technique must be accounted for in determining the time delay necessary for acquiring the demanded item. Various strategies for accommodating the different replacement techniques will be described.

Figure 5:
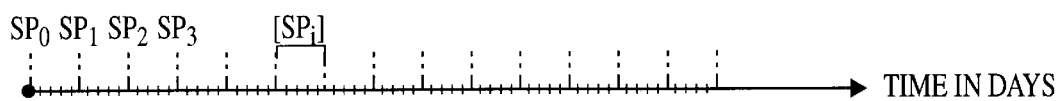
FIG. 5 shows the proposed time date parametrization, through which the proposed system is structured.

In a theoretical and continuous process for developing the demand and the replacement actions, it is necessary for practical purposes to establish discrete time intervals in order to discretely examine the demand and necessary replacement actions. Thus, time evolution is assumed to be divided into operative time periods [PSi]. At the control dates "PSi" which separate the operative periods [PSi], the control and operative actions proposed by the process take place. (See FIG. 5. FIG. 5 shows the proposed time date parametrization, through which the proposed system is structured.)

Figure 16:
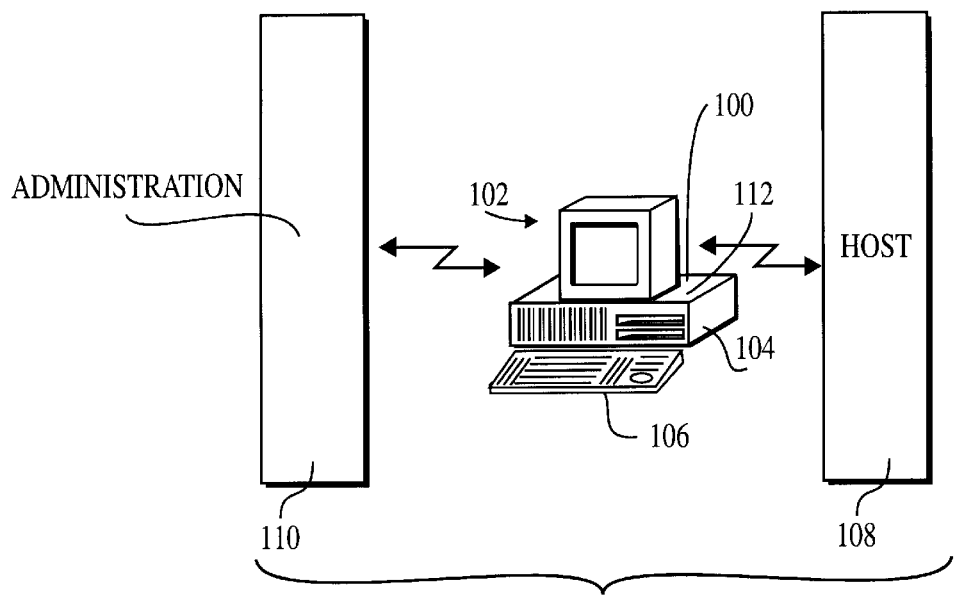
FIG. 16 depicts a computer system for forecasting inventory replacement orders for serving a plurality of forecasted and continuous demands in accordance with the present invention.

FIG. 16 depicts a computer system for implementing a system for forecasting inventory replacement orders for serving a plurality of forecasted and continuous demands. The system software includes a logistical system software implementation and the strategical/tactical replacement software, and it is housed in a store 112 which is in the computer work station platform 104. The platform 104 enables users to communicate with the logistical system software. More particularly, FIG. 16 depicts a conventional platform including a microcomputer 100, display 102, keyboard entry 106 for communicating with the microcomputer 100, and host computer 108. The microcomputer 100 may be a standard computer (i.e. IBM AT, Apple Macintosh, etc.) or a larger medium size computer (such as an IBM 36, etc.). When the store 112 is loaded with software programs including system software to be described, the platform 104 is formed. The information is received by the platform in two ways. First, information with regard to the external events (i.e. actual demands, manufacturing and purchases) may come from a host computer 108 or be input directly by administrative personnel 110. The system software, to be described, then calculates particular replacement proposals for meeting the actual demand. The administrative personnel can either act directly on the replacement proposals or use the replacement proposals as a starting point for analyzing and deciding how to order the replacements.

B. APPROACH TO DETERMINATION OF REPLACEMENT PROPOSALS

Figure 17:
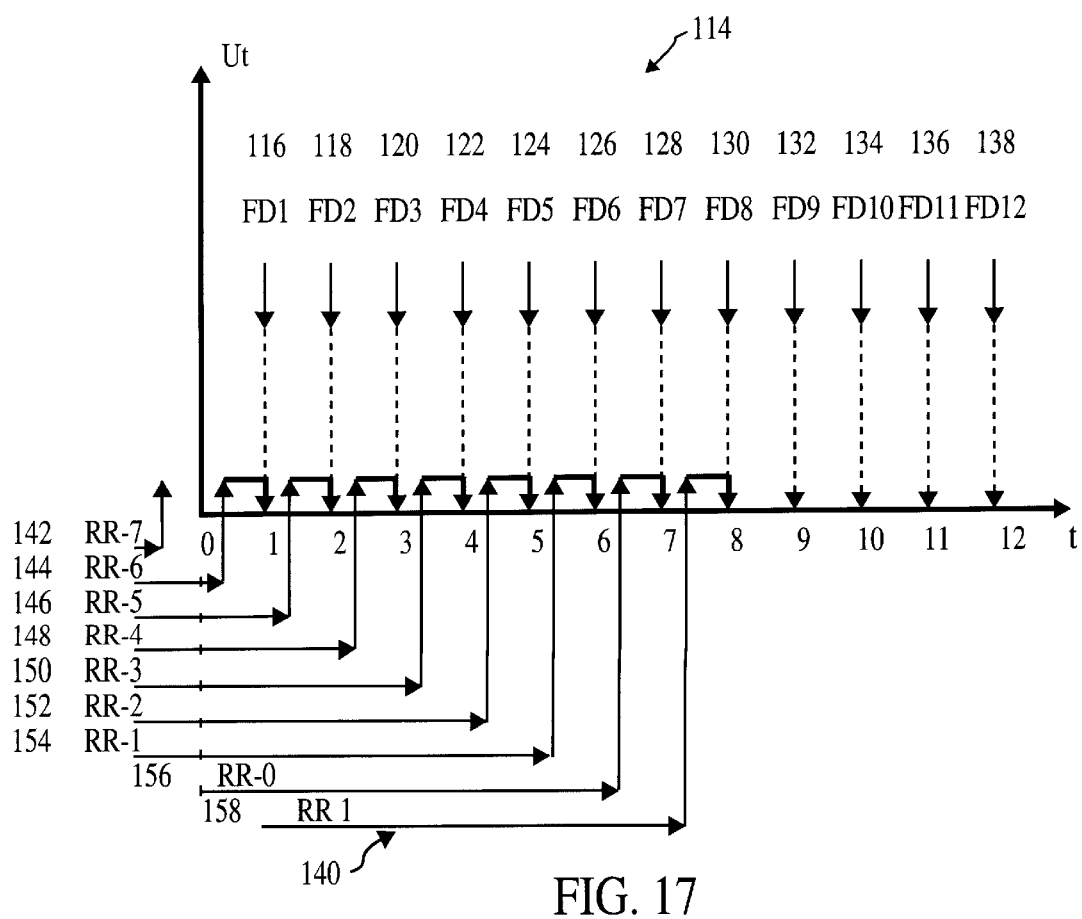
FIG. 17 depicts a simplistic replacement proposal during which a particular commercial item is shown having a series of forecasted demands being met by separate orders.

For purposes of explanation, let us first consider the principle behind normal demand and replacement. Referring to FIG. 17, a particular item is shown having a series of forecasted demands 114 being met by separate orders 140. Although the forecasted demand is a continuous one, in the preferred embodiment it has been discretely divided up into twelve equal sections. More particularly, forecasted demands 116 . . . 138 are of equal value. Additionally, it is assumed that the forecasted demand for each period occurs at the end of the period. To meet each separate demand 116 . . . 130, a separate order 144 . . . 158 is placed during a time frame far enough in advance to assure that the order is received prior to the forecasted demand. For example, order RR 144 was issued a number of periods prior to the forecasted demand $FD_1$ 116 in order to assure that when the forecasted demand $FD_1$ 116 arrived, items would be available for meeting the demand. The replacement order must be given within a sufficient time to account for the delay period for purchasing or manufacturing the order. In this example, the replacement delay time "A" is considered to be more than six periods and less than seven periods in duration. As shown at time equal to zero, the replacement order $RR_0$ 156 is placed at time zero in order to meet the forecasted demand $FD_7$ 128 at period 7. Likewise, at time period PSi=1, order $OR_1$ 158 is placed in order to meet the forecasted demand $FD_8$ 130 to occur at the end of period 8. Obviously, this process continues until time is equal to infinity (PSi=infinity).

A few observations can be made from this exercise. First, at each "PSi" a control status check is done and a new replacement order is issued several periods earlier than the forecasted demand which must meet. These several periods together have to be equal to the replacement delay time "A", rounded down to a whole number of time periods [PSi], plus a control period that in this case is equal to 1. If the reaction delay of seven periods is inaccurately estimated, then the order will not be received in time to meet the corresponding forecasted demand.

From these observations a formula may be derived to calculate the maximum amount of inventory and/or launched replacement orders available after each replacement order. This maximum amount must be equal to all forecasted demand which is expected to be received until the next replacement order (made also according to defined rules) may be received. This maximum amount will be called Maximum Reaction Capacity (MRC). Mathematically it is represented by:

$$MRC_i = \sum_{j=i+1}^{i+(A)+1} FD_j$$

where $MRC_i$ is the maximum amount of available inventory and/or replacement orders necessary to meet the forecasted demand until the next replacement order is received. (A)+1 is the time frame necessary, in this example, to control and also to produce the item, and "$FD_j$" is the forecasted demand for the item during each time period "j". Each new order launched on each control date has to complete the value of the previous available inventory and/or replacement orders, until it reaches the value of the "MRC" for this date.

Figure 18:
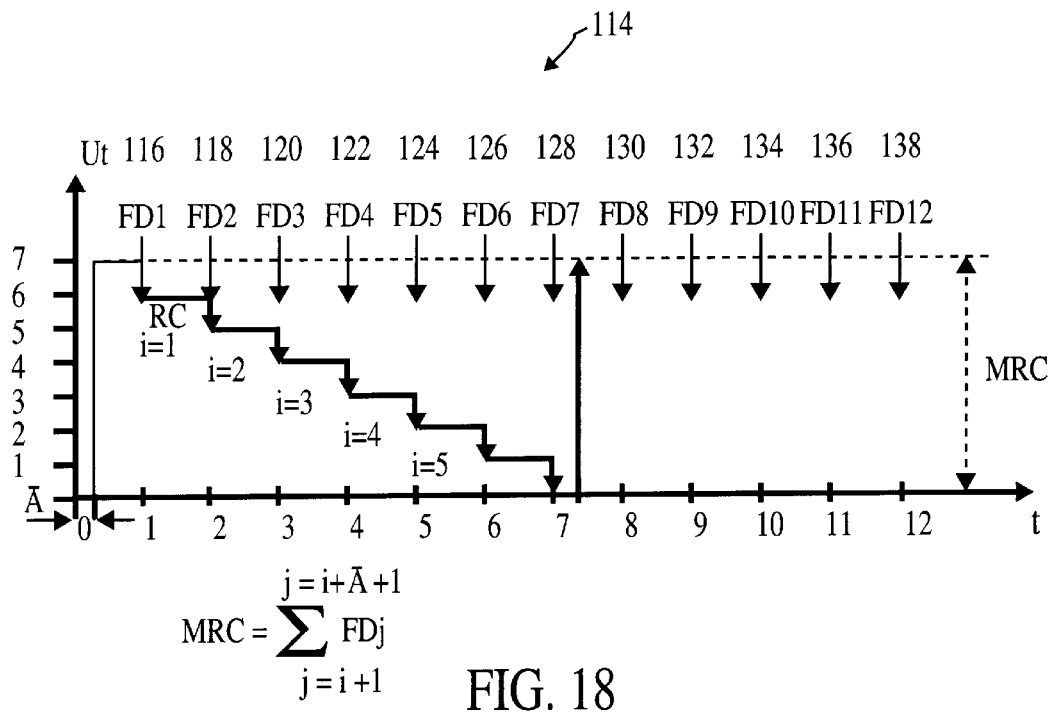
FIG. 18 depicts the simplistic replacement proposal for which the maximum amount of replacement stocks necessary for meeting the forecasted demand for a particular delay period "A" has been received and eliminated over time.

Referring to FIG. 18, in the specific case where "A" equals $F_1$ time periods, "$MRC_i$" may be thought of as the Maximum Reaction Capacity (MRC) for handling the forecasted demand for seven periods, as the control situation has been established each seven periods. At the seventh period, a new order must be issued in order to accommodate the forecasted demand. As shown in FIG. 18, the number of available items remaining for meeting the forecasted demand is reduced between each time period. The remaining items are considered to be the reaction capacity (RC) for the time period. For example, during the first time period, the "MRC" is seven units and the "RC" is reduced to six units. Then, during the second period, the "MRC" continues to stay constant at seven units and the "RC" is further reduced to five units and so on until the seventh period when the "RC" is reduced to zero units. This period is also the control period during which a new replacement order proposal shall be emitted equal to $MRC_i-RC_i$, where "$MRC_i$" is the Maximum Reaction Capacity foreseen at this period and "$RC_i$" is the Reaction Capacity remaining at this period.

Assuming that the demand for the item depicted in FIG. 18 requires one component item in order to replace the item, then a successive updated reserve order must be made during each time period in order to reserve the necessary component item to replace the depleted supply of items at the end of the fixed period. Stated differently, the difference between the "MRC" forecasted and the "RC" of the item will get bigger with each period which creates an internal demand for requesting, reserving or "stealing" from the supply of the component item which is necessary for producing the item. Mathematically stated:

$$IDe_i = MRC_i - RC_i;$$

where "$IDe_i$" is th e internal demand emitted or reserve requested of necessary component item to maintain a strategical environment of the item (RC+ID) equal to its "MRC". "$MRC_i$" is equal to t he maximum reaction capacity foreseen in each period, and "$RC_i$" is equal to the reaction capacity for each particular time period.

Figure 19:
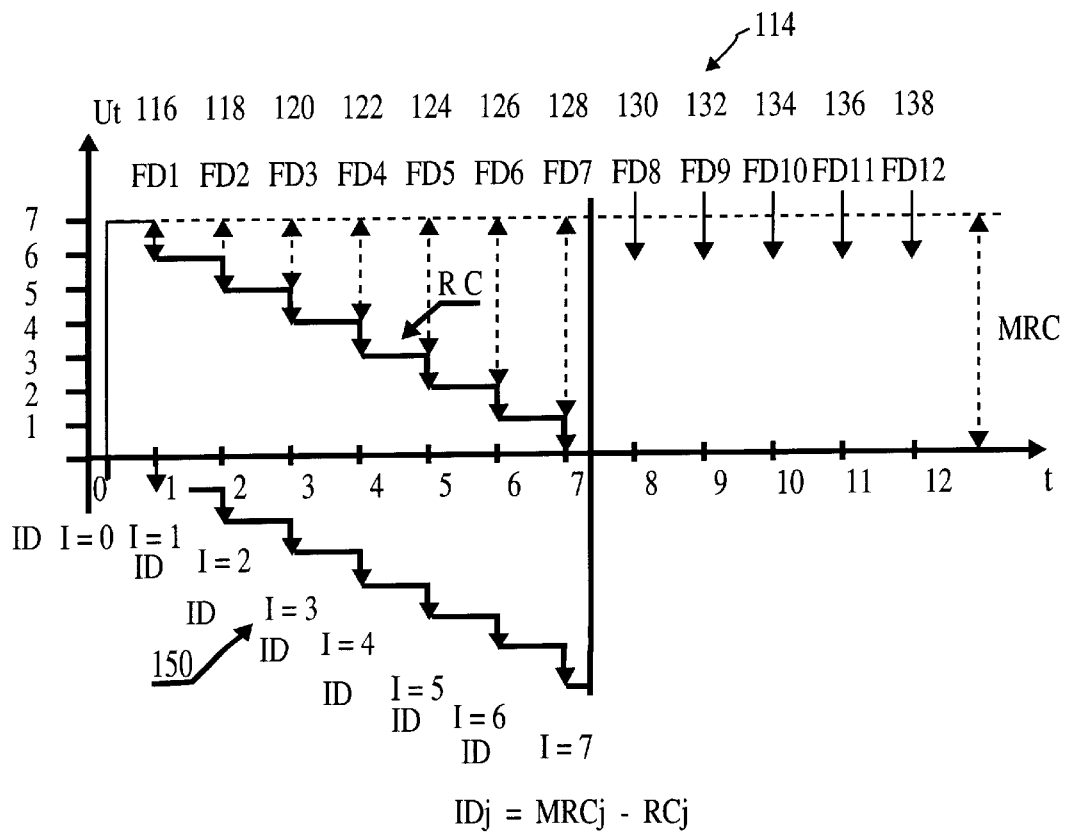
FIG. 19 depicts the replacement proposal of FIG. 18 for which the replacement reserve requirements (i.e., internal demand, $ID_i$) for each succeeding time period are shown.

Referring to FIG. 19, the internal demand emitted ($IDe_i$) for each succeeding time period is shown by the curve 150. The reserve requirements may be translated or converted into the number of component items necessary to produce the required supply. In other words, if two units of a component item were necessary for producing each unit of the item, then the total value of the previous internal demand emitted will be multiplied by 2 to determine the number of components necessary for producing the item.

In sum, an internal demand emitted "$IDe_i$" for a component item is defined as the demand that an item updates for its component items in every time period in order to render it possible to make up the value of its reaction capacity "RC" to the ideal maximum reaction capacity (MRC) forecasted for the item in that period. More specifically as stated above, the internal demand emitted $IDe_i$ for the components must be adjusted by the ratio $r_j$, i.e. the number of component items necessary for producing a particular item. Additionally, the internal demand emitted may also be adjusted for irregularities which may be caused in the production of the items. Therefore, the percentage of loss due to irregular production of the items (m) is compensated for by having more items as components ordered during each time period (1+m), thus obtaining the internal demand received $IDr_i$, by each component item of the item, as:

$$IDr_i = IDe_i \times r_j \times (1+m)$$

Figure 20:
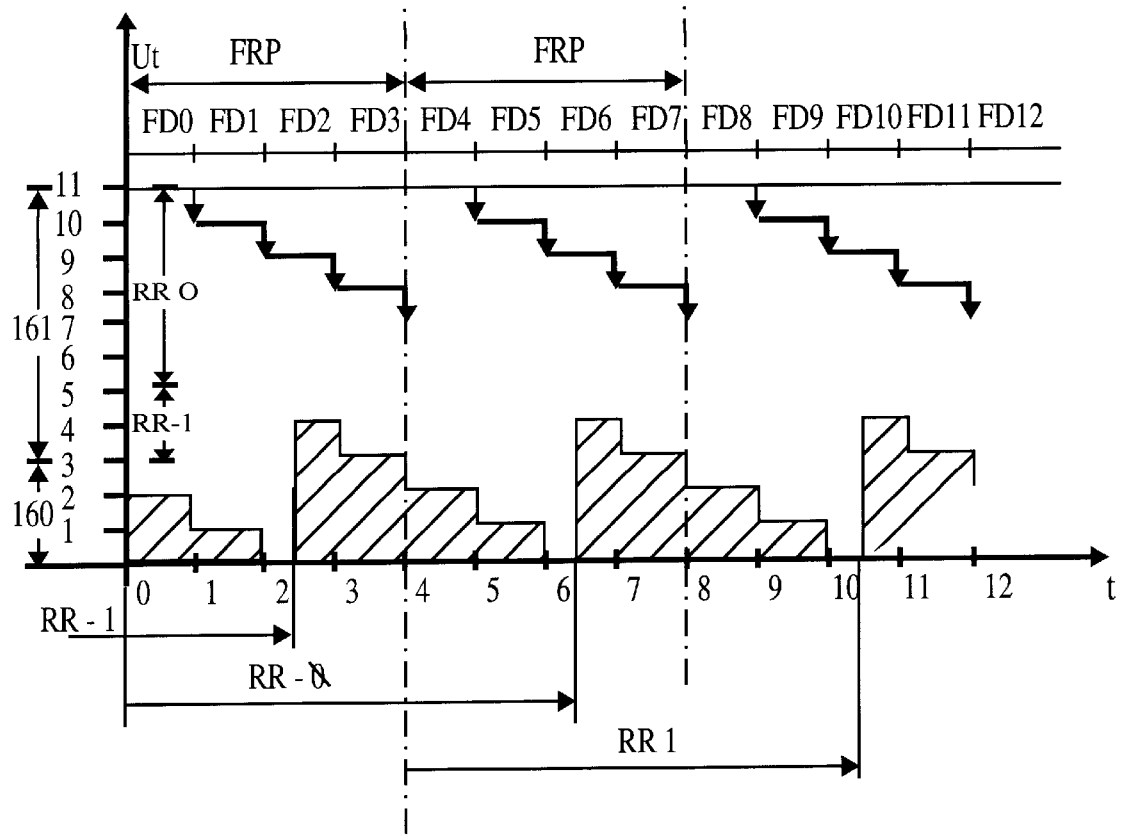
FIG. 20 depicts the replacement procedure for an item having a fixed replacement type situation for which the fixed replacement period is 4[$PS_i$] and the replacement time delay period (A) is 6[$PS_i$]

Referring to FIG. 20, in a common replacement situation, it takes a certain time A to generate the replacement order. In these situations the "RC" may include available inventory ("existing units") 160 and replacements ordered but not yet received 162. FIG. 20 is a graphical depiction of the effect of the fixed replacement period (FRP), shown when (A)=6 periods and the control period is FRP=4. The available inventory, and for that reason, the "RC" value, is reduced over the time between two replacement order launchings (which for items of the Fixed Replacement Period type means during the FRP). The calculation of the internal demand emitted by the item, $IDe_i=MRC_i-RC_i$, and the calculation in each control period of the replacement order proposal, $RR=MRC_i-RC_i$, are performed in the same manner as discussed earlier, where "$MRC_i$" is the Maximum Reaction Capacity foreseen in each specific "PSi" and "$RC_i$" is the Reaction Capacity remaining in each "PSi" considered.

It should be noted that the strategy discussed above for obtaining a reserve of direct component items necessary for replacing the "father" item (i.e., the directly associated higher level item) can be applied to obtain in each time period the forecasted internal demand that each "father" item will request from these associated component items, as the increase of the forecasted internal demand emitted by the item "father" from the prior time period, the forecasted internal demand emitted by the "father" item in each time period being the difference between the maximum of the available inventory and/or replacement orders issued and still pending for this item and the remaining amount available of inventory and/or replacement orders issued and still pending for the item after the forecasted demand associated with the item depletes this amount. Mathematically:

$$FIDe_{i-1}=MRC_{i-1}-RC_{i-1}$$

$$FIDe_i=MRC_i-(RC_{i-1}-FD_i)$$

$$\Delta FIDe_i=FIDe_i-FIDe_{i-1}=FD_i+(MRC_i-MRC_{i-1})$$

where "$FIDe_{i-1}$" and "$FIDe_i$" are the forecasted internal demand emitted by the "father" item in each time period i–1 and i, "$MRC_{i-1}$" and "$MRC_i$" are the maximum amount forecasted by the "father" item in each time period i–1 and i, "$RC_{i-1}$" and "$RC_i$" are the reaction capacity remaining in the "father" item in each time period i–1 and i, and "$\Delta FIDe_i$" is the variation (increase) in forecasted internal demand emitted by the "father" item from the prior time period.

The above variation in forecasted internal demand emitted duly modified by flaws and structural relations becomes the forecasted internal demand received by each directly associated component item from the "father" item. This forecasted internal demand received by each directly associated component item is added to the forecasted demand of each of these items.

Figure 21A:
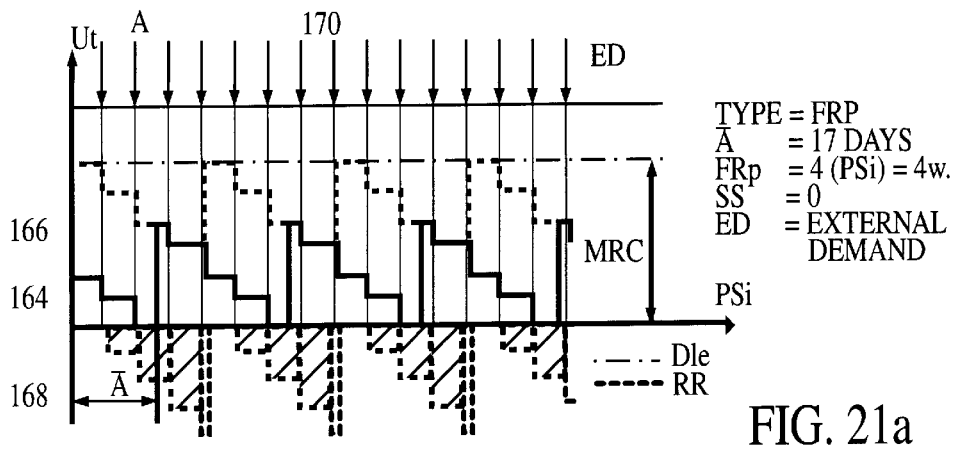
FIG. 21a represents the replacement proposal for a commercial item having a fixed replacement type situation for which (A) is 2[$PS_i$], fixed replacement period is 4[$PS_i$] and there are no safety stocks.
Figure 21B:
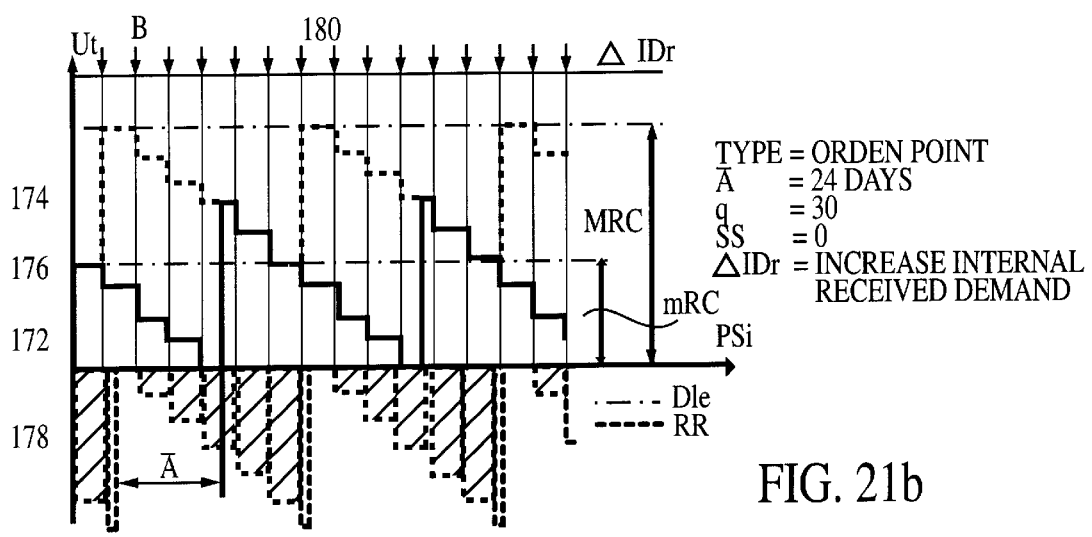
FIG. 21b depicts the replacement proposal for a component B which is used to make commercial item A, where component B has an order point replacement type situation for which (A) is 3[$PS_i$] and the batch amount is 30 units.
Figure 21C:
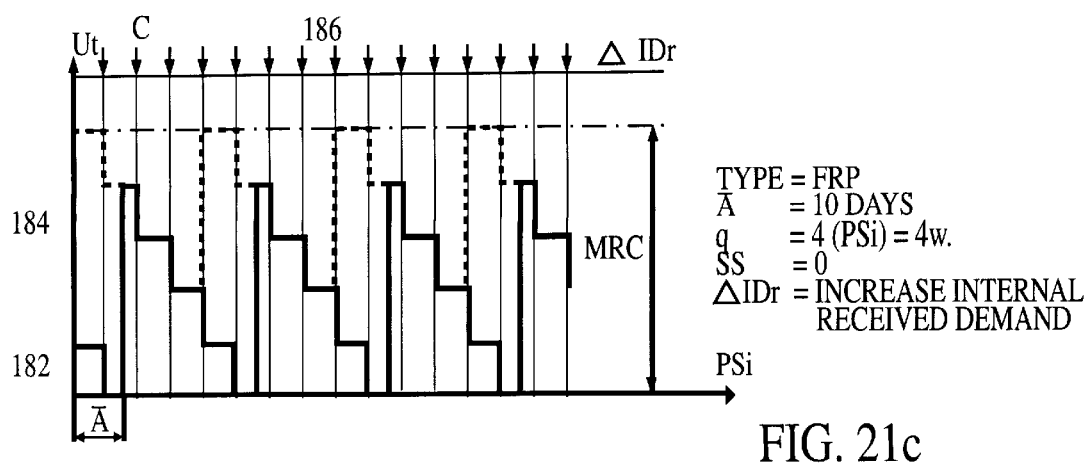
FIG. 21c depicts the replacement proposal for component C which is used to make component B, where component C has a fixed replacement type situation for which (A) is 1[$PS_i$] and the fixed replacement period is 4[$PS_i$].

Referring to FIGS. 21a, 21b and 21c, an example is made to show the forecasted evolution for maintaining the available inventory and/or replacement orders for an item or its associated component items. FIG. 21a depicts the strategical environment for a commercial item "A". External demand (ED) is shown in units at 170. The available inventory of items at t=0 is shown at 164. The replacement orders launched up to this point for maintaining the "MRC" are shown at 166. The replacement technique is a fixed replacement type. The replacement delay time "A" is seventeen days, which is rounded to a two-week period (A)=2 [PSi]. The control period or fixed replacement period for making replacement orders is four weeks, i.e. 4 [PSi]. The total time adding replacement delay and the time for making an order is six weeks, i.e. six time periods, 6 [PSi]. For this example, item "A" has no safety stock. Referring to FIG. 21b, the available inventory of component item "B" is shown at 172 for t=0. The replacement orders on order for item "B" at t=0 are shown at 174. Item "B" uses a replacement technique of the order point type. Therefore, whenever the available inventory of item "B" goes beneath the level shown at 176, an order is triggered. The replacement delay period is twenty-four days, rounded off to three time periods—(A)=3 [PSi]. Item "B" has no safety stock. As the internal demand emitted is determined by the formula, $IDe_i$ is equal to $MRC_i-RC_i$ as shown at 168, and the variation in internal demand received from item "A" becomes the demand received for item "B" as component as shown at 180. In this example, item "A" and item "B" have a one-to-one relationship. However, item "B" requires a lower level component item "C", for producing it. In this example, there must be two "C" component items for every B item. The internal demand emitted for item "C" is shown at 178 and the demand received for item "C" as component is the difference in the variation of internal demand received from item "B" over time as shown at 186.

Item "C" is replaced using the fixed replacement technique. It has a replacement delay period of ten days and a fixed replacement period of four weeks. The total time, adding the replacement delay and fixed replacement period, is rounded off to five weeks or 5 [PSi]. The available inventory of item "C" at t=0 is shown at 182, and the replacement orders launched up until this point for item "C" at t=0 are shown at 184.

As shown in FIGS. 21a, 21b and 21c, the external demand for item "A" is transparently transmitted as internal demand received to both component items "B" and "C". The related demands are calculated during each time period and the necessary reserve of component is made. When a new replacement order proposal has to be made as $MRC_i-RC_i$, the necessary reserved component item will be available. This methodology can be used for any number of items having any number of items as components. Note that item "C" does not create an internal demand simply because it is a base item which requires no other component items for its production.

C. A DETAILED DISCUSSION OF THE PREFERRED EMBODIMENT OF THE INVENTION

1. Logistical Environment

In order to envisage the physical environment for which the present invention has been conceived and developed, it should be mentioned that the most important characteristics of the physical environment are: 1) External demand, 2) logistical system, and 3) Establishing a Time Variable.

Figure 6:
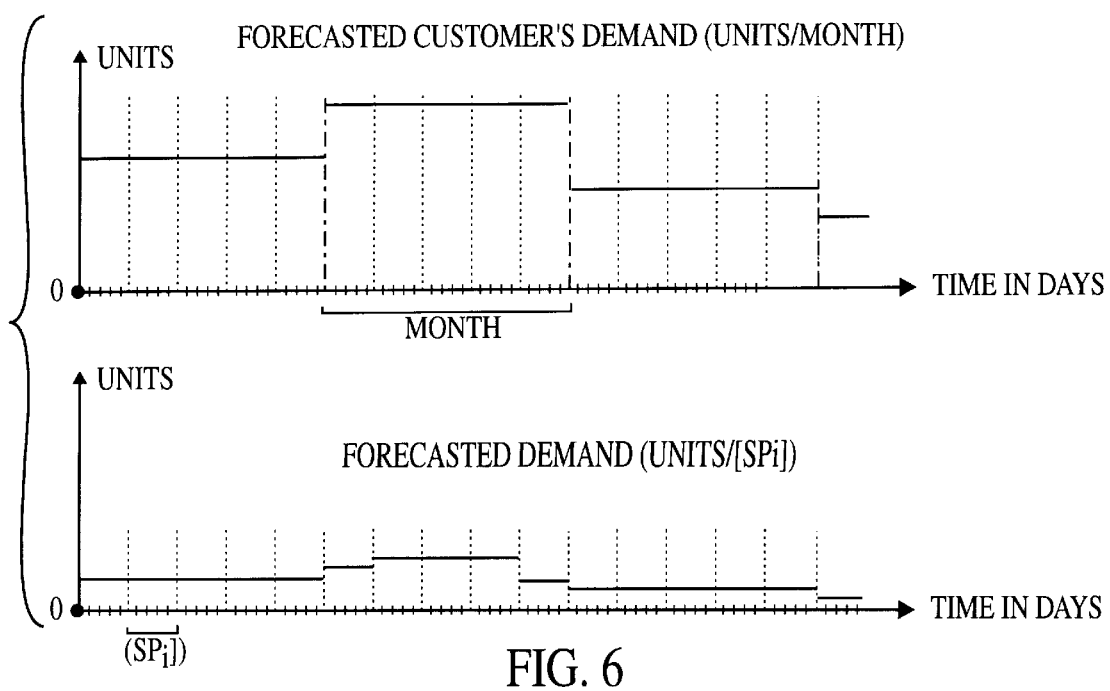
FIG. 6 shows the parametrization of the Forecasted Customer Demand, assumed given in monthly values into system periods [$SP_i$]

Orders in quantities that can be forecasted, but which are variable and successive in time and can be considered "continuous", for practical purposes, of determined physical objects (known as "commercial items"), with defined, stable characteristics that bear an associated code or reference number which identifies them uniquely. The future demand forecasts can be defined in the so-called Sales Forecasts, which express the units of each commercial item for which orders are expected for successive periods of time, during these periods of time. (See FIG. 6. FIG. 6 shows the parametrization of the Forecasted Customer Demand, assumed given in monthly values into system periods [$SP_i$]) These Sales Forecasts are input and update from outside the Logistical Environment.

The logistical system is the set of elements, relations, operations, etc. that have as their purpose the definition and execution of the physical processes necessary for obtaining the "commercial items", and which in turn allow the external demand for these items to be met. Thus, the logistical system, which we shall consider as "logistical environment", will be composed of and defined, for informative purposes as follows.

Items are physical objects, with well-defined, stable characteristics, that bear an associated code or reference number which identifies them uniquely. The items are always obtainable and enter the logistical system by means of a physical operation (purchase, transport, manufacturing process, etc.).

The above operation may or may not include the involvement of other items, which we shall then refer to as "components". If the operation involved in obtaining the item does not require the involvement of direct component items, it will be a purchase operation and will at all times be performed from outside the logistical system.

The relations that determine the involvement of the necessary component items in each operation, are the "structures" (bills of materials). Those items of the system that are subject to a real or forecasted demand from directly outside the logistical system (External Demand) will be known as "commercial items." If such items further demand other items for their production, then these demanded items will be known as components in these specific relations.

The structure is a stable definition (input and updated from outside the logistical system so that it can be used by the system) of the relations for creating each item with regard to the number and identification of its direct component items, in order to carry out the operation involved in obtaining the item. By "structure", we refer to the ordered set of successive relations which, as the previous relation between the "father" item and the items which are directly associated to it as components, enables a particular item to be obtained (for example, a commercial item) from items which come into the system by means of purchase operations.

In a logistical system such as that being described here, there may be many different structures (ills of materials) and one single item may belong to all or part of these. However, the structural relations defined for obtaining any item in the logistical system should always be identical if the item is built into, or belongs to other superior structures (structures in which this item acts as a component). In the context described above, each item within the logistical system will be identified according to the "level" it occupies in the different structures to which it belongs. Given a determined structure relating to the production of a commercial item, this item will be assigned "level" 1. Its direct component items (if these exist) will be assigned "level" 1+1=2, and the respective component items of each of the above component items will be assigned "level" 2+1=3, etc.

Figure 3A:
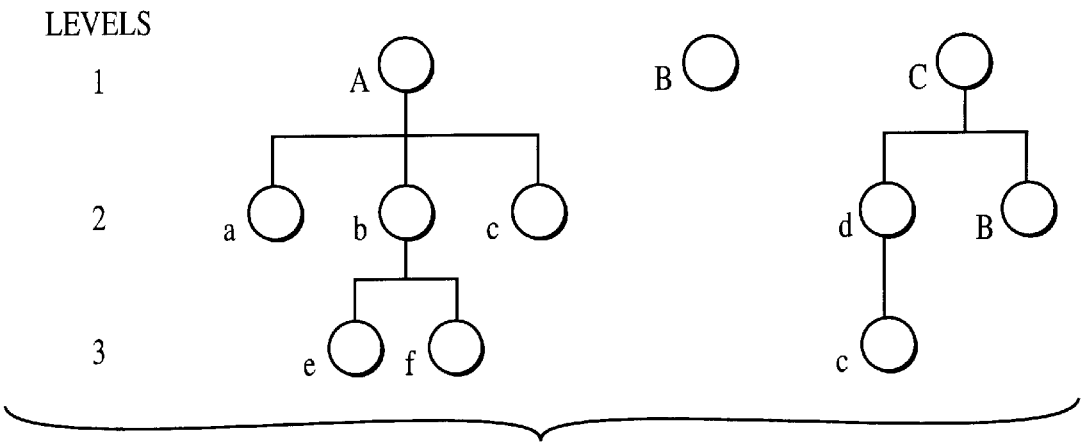
FIG. 3a shows several hierarchical structures (Product Trees) of three items associated as commercial items (A), (B) and (C), and the items associated to them as their respective components, in each respective Product Tree.
Figure 3B:
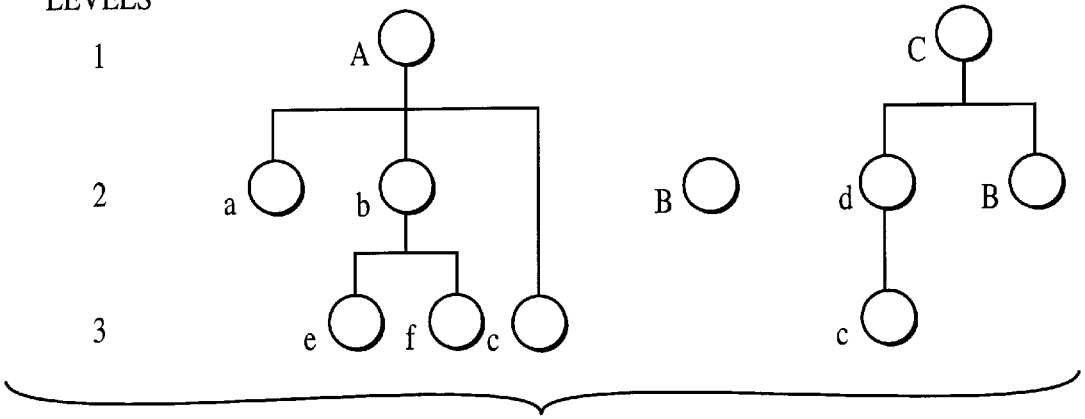

Assuming that the "level" of each item has been obtained for each particular structure in which it appears, the "level" associated to this item individually in the logistical system will be the one corresponding to the lowest-level position (highest number in the order) it has been assigned in the individual structures. (See FIGS. 3a and 3b. FIG. 3a shows several hierarchical structures (Product Trees) of three items associated as commercial items (A), (B) and (C), and the items associated to them as their respective components, in each respective Product Tree. FIG. 3b shows the hierarchical global structure of the items associated as commercial items and/or components to each Product Tree shown in FIG. 3a.)

Figure 4A:
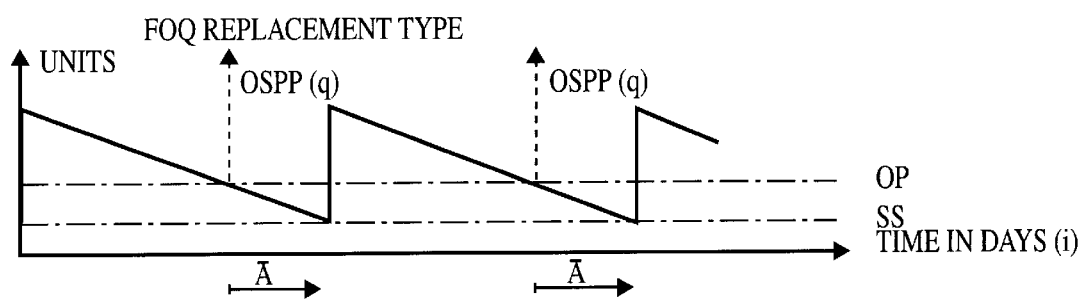
FIG. 4a shows the forecasted evolution of the Stock On-Hand and Supplying Processes of a commercial item, managed through the Fixed Order Quantity (FOQ) Replenishment Type at the classic Production to Inventory system, supposing a constant Forecasted Customer's Demand along time.
Figure 4B:
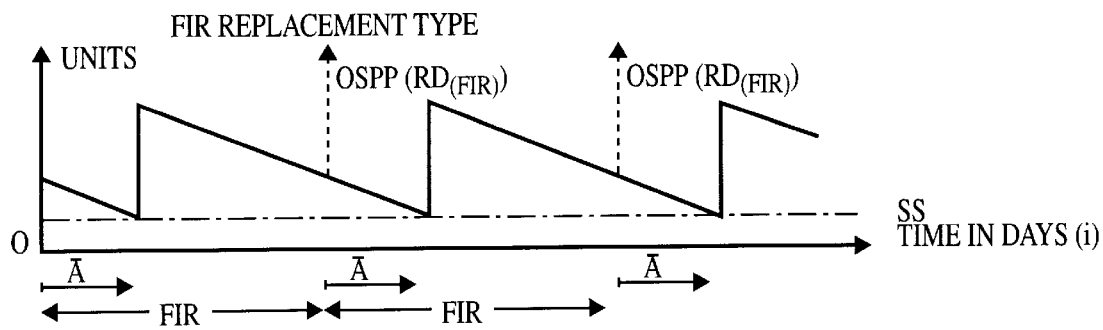
FIG. 4b shows the forecasted evolution of the Stock On-Hand and Supplying Processes of a commercial item, managed through the Fixed Interval Reorder (FIR) Replenishment Type at the classic Production to Inventory system, supposing a constant Forecasted Customer's Demand along time.

An operation is the generic physical process by which an item is obtained by or built in the logistical system. Each item should have one single physical process by which it can be obtained, although this may be generic (for example, carried out by similar machines, although they do not have to be exactly the same or exclusive). Operations for obtaining or replacing items, which in principle are considered in the logistical system being described here, are defined by a series of characteristics (expected or claimed) about which the logistical system is informed from outside the system, operating parameters which should be taken into account in the calculations and forecasts necessary for future coordination. These calculations can be carried out in sequence and in a determined manner, and resemble the traditional "Stock Replacement" operations. The replacement orders can be in batches (for example, when the Order Point is reached See FIG. 4a. FIG. 4a shows the forecasted evolution of the Stock On-Hand and Supplying Processes of a commercial item, managed through the Fixed Order Quantity (FOQ) Replenishment Type at the classic Production to Inventory system, supposing a constant Forecasted Customer's Demand along time.), or in the necessary quantities at each "Fixed Replacement Period" (FRP), (See FIG. 4b. FIG. 4b shows the forecasted evolution of the Stock On-Hand and Supplying Processes of a commercial item, managed through the Fixed Interval Reorder (FIR) Replenishment Type at the classic Production to Inventory system, supposing a constant Forecasted Customer's Demand along time.) or in the necessary quantities whenever a demand exists ("Replacement Order"). The choice between these alternatives is given by the "Replacement Type" operating parameter.

There will be fixed control periods which will always be the time period [PSi] of the Logistical Environment, but there may be control periods that are different, such as the FRP. Each item may or may not have an average percentage of losses "m" in going from the total number of items obtained during the operation to those accepted as usable. Each item's replacement operation has a total global replacement time "A" associated with it—from the time an order is issued until the first items have been accepted and controlled—as if it were a "purchase" operation. It is understood that in the logistical system, the "load" and "capacity" of its forecasted operations are balanced, and therefore the quantity "A" will exhibit real values which are not excessively out of proportion to the forecasted ones.

In a theoretically continuous process of development of the demand and the replacement actions, it is necessary for practical purposes to establish parameters for the development of the time variable, determining operative time periods [PSi], at whose beginning and end dates "PSi" control and operative actions proposed by the process take place. For example a [PSi] may be as short as an hour or as long as a year.

2. Functional Characteristics

The main functional characteristics of the present invention are now described. The proposed invention can basically be defined by two main characteristics. First, the external demand that request the logistical system is transmitted in a virtually "transparent" fashion (and thus with the same characteristics and continuity of the external demand) to each and every one of the items in the logistical system. Second, the above-mentioned demand received by each item in the logistical system is met by them on an individual and immediate basis, through "strategical environments" which are replaced using stock replacement techniques.

In other words, a strategical-tactical combination is used, in which the forecasted "strategical environments" are generated as necessary and in which the demand actually received is met through the "strategical environments", at the same time that these are replaced whenever necessary, in order to prepare them to meet new future demands, depending on the forecasts.

To end this process in an elementary and progressive way it is explained in the following steps.

3. Stock Replacement Techniques for Isolated Items a. PROCESS OF ELEMENTARY CONTROL AND REPLACEMENT Let's consider an item which throughout time has been receiving a continuous demand. Referring to FIG. 17, the time is divided into operative periods called [PSi] at whose beginning and ending dates "PSi" the demand 116 . . . 138 that the item receives throughout or at the end of each preceding period is considered to be concentrated. The replacement orders (RR) 142 . . . 158 that are received throughout one operative period [PS$_i$] are also considered to be received at the corresponding "PSi". Each RR has an entire forecasted time "A", in order to carry out the process from the time it issues the order until the ordered units are received and are in control. The replacement operations considered are generally registered at a point in a single action of control. At each "PSi", an order RR is issued, which must take care of the expected demand which is received (A)+1 periods later, in which (A) is equal to "A" rounded down to a whole number of periods [PSi] and the control period is 1.

As a result, we can see that throughout the entire time period [PSi] the RR orders issued (A)+1 time periods earlier are able to satisfy the demand received at this particular [PSi], at the same time a new order is issued to satisfy expected demand (A)+1 time periods later on. In other words, we are dealing with a constant process of receipt and issuance of orders (RR's) at each [PSi].

i. Maximum Reaction Capacity (MRC)

As we have seen, at each "PSi" it is necessary to have enough inventory in stock (available existing supply) and/or orders launched (replacement orders) to be able to satisfy the expected demand for (A)+1 time periods [PSi]. The Maximum Reaction Capacity (MRC) is a "potential" reaction capacity of the items in relation to future demand, where the temporal distribution of the demand and replacement orders is not considered, but rather only the potential aggregate amount needed to satisfy wholly these demands. The MRC concept refers to the maximum amount of available inventory in stock and/or replacement orders issued and pending, necessary to meet all the forecasted demands which are expected to be received until the next replacement order can be received.

Analytically speaking, the "MRC", in this case, will be expressed for each "PSi" by:

$$MRC_i = \sum_{j=i+1}^{i+(A)+1} FD_j$$

MRC$_i$ is equal to the value in units of the maximum reaction capacity that the item can have in that particular "PSi". (A)+1 is the time frame necessary for control and also for producing the item, and "FD$_j$" is the Forecasted Demand for the item during each time period "j".

ii. Reaction Capacity (RC)

Given that the preceding parameter MRC refers to the potential reaction status of an item as a way of expressing the capacity to meet future demands, a control parameter referred to as "RC" is defined in order to estimate the real potential capacity. RC refers to the units and orders available in process which an item may have at any particular moment in order to react potentially to meet expected demands.

Analytically speaking the control parameter RC in the case of isolated items will be given as:

RC=E+RR−PD where "RC" is equal to the Reaction Capacity in units, "E" is equal to the existing inventory in units, "RR" is equal to the total issued and pending orders in process in units, and "PD" is equal to the pending demand in units.

The value of the "RC" of an item may be estimated at any moment, and for that matter before and after a command replacement (on account of which the value of "RC" will have changed). In relation to this potential control parameter it doesn't matter whether or not an order has been transformed into units of stock or if the demand received remains pending or has been satisfied. "RC" registers the real evolution of the item in relation to its potential reaction in the future, as it considers the real demands and the real evolution of the orders as well as the incidents that affect the item. "RC" reflects what is actually available at the particular point in time "PSi".

iii. Replacement Proposals

In the real evolution of the logistic exploitation the demands aren't usually the expected ones, carrying out the replacement orders doesn't turn out as planned, and there occur atypical movements which sporadically affect the fields observed by the "RC" of the item.

For these reasons, the parameters defined in the two previous sections may be of great use to us, in that the "MRC" indicates the potential value available that after a command of an operative replacement order is made must exist in the item, while the "RC" indicates the real potential value available of the item that exists at a particular moment, whatever the evolution may have been.

Once the "RC" of the item is up to date, it should be easy to know what value of the replacement order is needed in order to make the "RC" have the same value as that of the "MRC" expected at this point.

In other words, the

Proposed Order=MRC$_i$−RC$_i$. Therefore, immediately after the order is issued, the value of the item's "RC" will be identical to the "MRC$_i$".

b. PROCESS OF GENERAL CONTROL AND REPLACEMENTS

One of the most common operative ways of performing stock replacement is the "Fixed Replacement Period Type" (FRP), which we take as a reference in order to apply and complete the parameters previously proposed.

Figure 7:
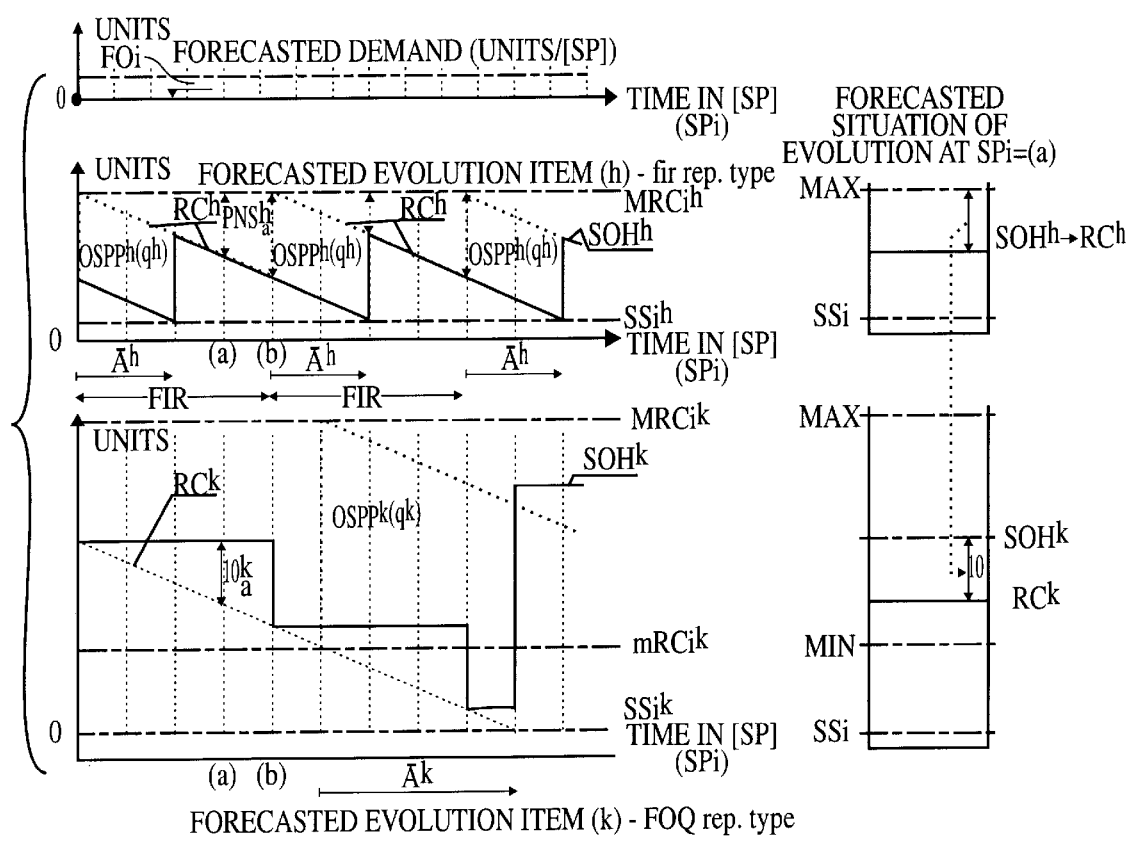
FIG. 7 shows the forecasted evolution of a commercial item (h) (supposing a Fixed Interval Reorder (FIR) Replenishment Type assigned to it), and of its direct component (k) (supposing a Fixed Order Quantity (FOQ) Replenishment Type assigned to it), both managed through the proposed system, and supposing a constant Customer's Orders along time.

The basic methodology for the Fixed Replacement Period can be expressed as follows: "in each time interval shown as the item's FRP, an operative replacement order must be issued for an amount in units equal to the demand that is expected to be received between A and A+FRP, A being the forecasted value of the time from when the order is issued until it is received". Assuming that the division of the time is as described earlier and referring to FIG. 20, where the value for the "FRP" of the item is 4 time periods as 4 [PSi], then:

i. Minimum Reaction Capacity (mRC)

mRC expresses at each "PSi" the minimum value necessary in inventory and/or replacement orders in process that the item must have available in order to meet the immediate demand forecasted until a new order issued at this specific point can be received. (See FIG. 7. FIG. 7 shows the forecasted evolution of a commercial item (h) (supposing a Fixed Interval Reorder (FIR) Replenishment Type assigned to it), and of its direct component (k) (supposing a Fixed Order Quantity (FOQ) Replenishment Type assigned to it), both managed through the proposed system, and supporting a constant Customer's Orders along time.) Analytically:

$$mRC_i = \sum_{j=i+1}^{i+(A)} FD_j$$

ii. Maximum Reaction Capacity (MRC)

As described previously, the MRC parameter expresses the maximum value that can and must be reached by the potential reaction capacity of the item (inventory and/or replacement orders in process) after issuing each order on each corresponding control date "PSi".

In the case of the fixed replacement period technique, the total amount of the item in inventory and/or orders being processed that must remain available after each replacement order is issued at each control date "PSi" must cover the future forecasted demand to be received for the present PSi and up until (A+FRP) periods later. In other words, there must be enough to meet demand until it is possible to receive another order, at the next control date "$PS_i$+FRP" (see FIG. 7). Analytically:

$$MRC_i = \sum_{j=i+1}^{i+(A+FRP)} FD_j$$

If the replacement method is by "order point and replacement batch", the maximum reaction capacity (MRCi), must be equal to the minimum reaction capacity, previously calculated, plus the replacement batch size q, foreseen for this replacement procedure. In other words, a command for a replacement batch must be launched when the reaction capacity of the item is lower or equal that the minimum reaction capacity foreseen for the item in that specific "PSi" (see FIG.). Mathematically:

$$MRC_i = \sum_{j=i+1}^{i+(A)} FD_j + q$$

Both the fixed replacement period and the order point techniques for calculating the maximum reaction capacity may be supplemented by adding a safety stock calculation. The safety stock (SS) is the amount of stock sufficient for overcoming demands during shortage periods where there is no inventory remaining. Thus, the formula for the fixed replacement period calculation for maximum reaction capacity would be:

$$MRC_i = \sum_{j=i+1}^{i+(A+FRP)} FD_j + SS$$

and the order point method for determining maximum reaction capacity would be:

$$MRC_i = \sum_{j=i+1}^{i+(A)} FD_j + q + SS$$

iii. Operative Replacement Proposals

The philosophy between the strategic parameters, which indicate how things should be, and the tactical parameters, which reflect how they are, is also maintained but with the following considerations just as to "when" the replacement must take place. In the case of replacement by the Fixed Replacement Period technique, perfectly determined by the "PSi" of "control" already described (in periods "FRP"), the "mRC" parameter can be used in order to consider at each "PSi" the possibility of shortage and to suggest, if such a possibility exists, an immediate order before reaching control date "PSi" that is holding it up. In the Order Point replacement technique, the "mRC" parameter is used in order to know "when" to replace the item. Just "how many" to order, i.e., the quantity to be obtained in these cases of operative replacements, is determined by comparing the potential reaction capacity "RC" with the "MRC" foreseen at the corresponding "PSi", since this difference will be that which directs the issuance of orders so that the "RC" is the same as the "MRC".

4. Stock Replacement in Hierarchical Structures of Items with Components

In the individual processes of isolated items analyzed before, we observed a series of worthwhile advantages. As a result of the forecasted demands and of the characteristics and values of specific replacement orders for each item, it is possible to calculate the strategic parameters of replacement. "MRC" and "mRC" establish the criteria in order to maintain, within limits, an advanced replacement potential or potential reaction capacity to allow the factory to meet the forecasted demand as soon as it is produced, giving time for the operative replacements to take effect according to the criteria forecasted for them. Error in the forecasted demand only affects the value of the potential reaction capacity calculated by previous strategic parameters. The combination of parameters described corrects and considers the demand and the actual incidents occurring until the moment these proposals are made. It is possible to control the evolution of the real potential capacity "RC" in each "PSi", and to compare it with the strategic parameters in order to know quickly and without delay, the discrepancies between what it should be and what it is, and if necessary decide on the corrective measures to be taken. Another consequence of this situation is that of being able to calculate and assign values of operative safety stocks derived for example from Wilson's formulas.

In the event that safety stocks (SS) are assigned, their value must be added to the value of the strategic parameters "MRC" and "mRC" already calculated. Nevertheless these advantages and processes haven't been applicable up until now to the replacement of the component items that receive as demand the replacement needs of the "father" items, and for that matter demands separated in time and grouped together in quantity. The present invention proposes a process through which all characteristics described for the isolated item are also applied to any item of the logistical system whatever its position in the various structures to which it belongs. To do this within the context of the individual stock replacement system previously described, the following proposals and complementary processes are established.

a. STRATEGICAL ENVIRONMENT

From the derivation of the strategic parameter "MRC" described before, it can be established that in each "PSi" the components needed to complete the real potential reaction capacity "RC", must be made available, in the items with components, in order to reach the value of the "MRC" that is calculated and forecasted in the "$PS_i$".

In other words, if desired, it is possible by issuing replacement orders (RR), to top up whatever value the "RC" may have, until it reaches the value of the "MRC" forecasted for that particular control date "$PS_i$". This means that in the items with components it is possible to consider a reaction capacity which considers adding to the value of the item's own "RC" to that of the value which may be obtained from the component items in reserve. This potential value of reaction is named "strategic environment" and must be maintained constant or equal to the "MRC" theoretically foreseen for each "$PS_i$".

b. "INTERNAL DEMAND" (ID)

Along the lines of what has been proposed so far, the concept of "internal demand" is now defined. Internal demand is the demand which an item makes from the items which act as its components in every "PSi" in order to make up the value of its "RC" until it has reached the value of the maximum reaction capacity "MRC" forecasted for the item in that "PSi".

The constant process of elimination and replacement of an item described earlier is also maintained here by the strategic environment. The demands that reduce the "RC" (and for that matter its "strategic environment") will be compensated by "potential" item replacement orders. These orders are in fact the reserve of the component items that is carried due to the internal demand.

For instance, take the item whose demand and replacement characteristics are described in FIG. 21a. Call the item "A", and assume that this item is made from other component items. If we represent the evolution of the internal demand on a graph where the item A requires items "B" and "C" as its components, we have FIG. 8.

In other words, as the "RC" is being reduced between two "PSi" due to the demand received by the item itself, the difference between the "MRC" forecasted and the real "RC" of the item will grow by the same quantity if the "MRC" is maintained constant. The internal demand (ID) which requests or "steals" from the items which are its components, will maintain the "strategic environment" of the item at the same value of the "MRC" forecasted at this point.

Given that the internal demands (ID) must act like a normal demand that must be forecasted and met in order to satisfy the availability of the necessary component items, it is necessary to consider it as such in the control parameter "RC" that expresses to the real potential reaction capacity of the item. As a result:

$$RC=E+OR-PD-ID$$

Since so much the item own reserves as the total potential needed of the rest of the items, expressed through the internal demand, have been considered and deduced up until this moment. The updated parameter "RC" is again used—in order to compare it with the strategic replacement parameters and to get to know "when" and "how many" items have to be commanded. The parameter now considers the internal demand (ID) made by the "father" items in order to maintain their strategical environments, as simply as normal demand.

In other words, the parameter "RC" now expresses in each item the potential reaction capacity which it has available to meet future demands expected by the item.

c. TRANSPARENCY OF THE EXTERNAL DEMAND

One of the fundamental objectives of the present invention is to make the demand received by the component items have the same characteristics of continuity described earlier for commercial items in order to handle the component items with replacement stock techniques as if they were individual and isolated items. To achieve this objective the present invention uses its first proposal to replace in each PSi the "strategical environments" of the item with other component items and also the tactical definitions of the RC and the ID carried out up until now.

After getting up to date in each PSi with the demands and incidents of exploitation which may affect the "RC" of each item, the internal demand received and emitted by each item in the logistical system is obtained using a "cascading" sequence from the highest to the lowest level in what: (a) The new value of the "RC" of each item—which, at the time of processing must include the internal demands received by them—is compared with the "MRC" that the item in this "PSi" has forecasted. Thus obtaining, a new value for the internal demand with which the item demand from the items which act as its components. (b) The new value of internal demand that we have just obtained, duly modified by the flaws and structural relations, puts up to date by adding the total internal demand which affect these respective component items. This process will be repeated level by level of each item, as a separate one.

Figure 8:
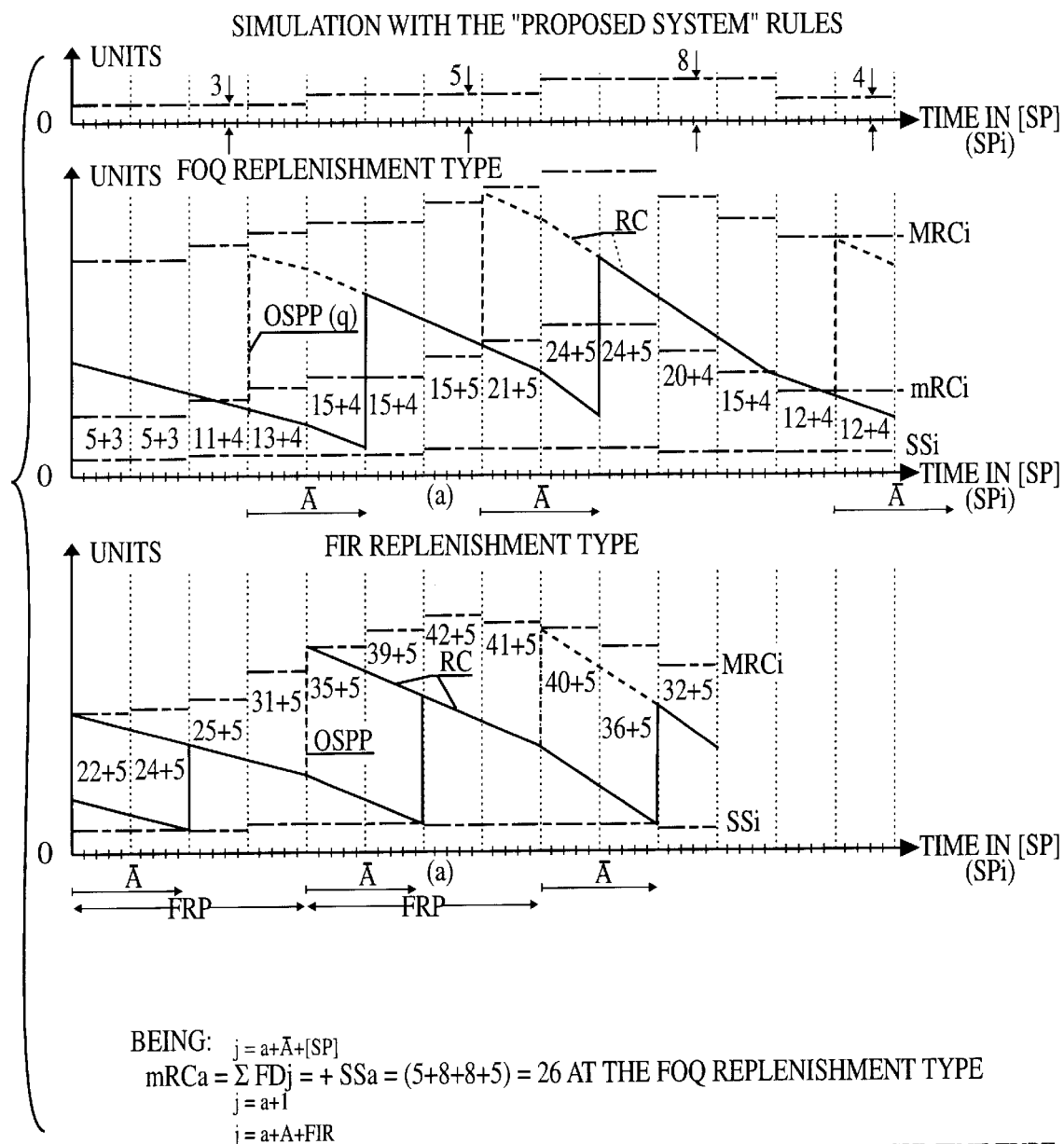
FIG. 8 shows the forecasted evolution of a commercial item (h), supposing first a Fixed Order Quantity (FOQ) Replenishment Type assigned to it and later a Fixed Interval Reorder (FIR) Replenishment Type assigned to it, both managed through the proposed system, considering for that simulation, a usual Forecasted Customer's Demand.

By this process and once the corresponding strategic environments have been created, each item with other component items receives and meets in each "PSi" a demand (or an increase in the previous demands) equal or equivalent to the increase of the demand with which the item reserves the necessary component items to compensate. As a result these items remain virtually transparent to the demand they receive. (See FIG. 8. FIG. 8 shows the forecasted evolution of a commercial item (h), supposing first a Fixed Order Quantity (FOQ) Replenishment Type assigned to it and later a Fixed Interval Reorder (FIR) Replenishment Type assigned to it, both managed through the proposed system, considering for that simulation, a usual Forecasted Customer's Demand.)

d. OPERATIVE REPLACEMENT PROPOSALS

As a result of the previous processes, the items which have other items as components will make available in any "PSi" of the evolution of the system enough units of these component items—ordered and reserved previously as an internal demand—to carry out the operative orders. The ordered units increase the "RC" that the item may have until it reaches the maximum value, equal to that of the forecasted "MRC" for this particular "PSi".

As in the cases of individual replacement described earlier and as a result, using the same determining proposals, by means of the strategic parameters "mRC" and "MRC" and the control parameters "RC", the time (when) and quantity (how many) for replacement orders are determined as if dealing with an independent item, isolated from the rest of the items in the logistical system.

e. OPERATIVE REPLACEMENT ORDERS

As previously indicated, when an item meets a demand received at some "PSi" with its forecasted available replacements "RC", this "RC" remains less than the demand. However, if we are dealing with an item having other component items, the item will request and reserve as components the necessary units of these component items in order to maintain the strategic environment of the item constant, i.e., equal to its "MRC" forecasted at this point. An operative replacement will consist for that matter transforming in the units previously reserved for this operative replacement, without letting it modify the value of the item's strategical environment. In other words, it is like transforming in an operative way the equivalent potential elementary replacements that have taken place on reserving the component items, where the operative replacement orders don't modify the status and potential evolution of the logistical system as a whole.

In order to complete the process that virtually complements the above mentioned proposal, the present invention proposes that in each order that is issued, the necessary component items are reserved in the form of Pending Demand (PD). The "RC" of the item will have increased by the value of the orders issued, and as a result the internal demand which the item emits to the items which act as its components before the order was issued will diminish at the same rate. The internal demand thus reduced is substituted, in the corresponding component items, by the equivalent value of Pending Demand (PD). As a result, the item does not change the value of its strategic environment, due to an operative replacement order, nor are the component items affected by the operative replacement order, since the demand received by them is the same as before.

The maintenance of the "strategical environment" in the items with other component items is equivalent to the way items act, in relation to the rest of the items in the logistical system, as if they were carrying out elemental replacements in each "PSi" that substitute the demands received and met by the item.

Externally and in relation to the rest of the items in the logistical system, it is as if they didn't exist, because they transmit the demand. They meet the demand delivering (or reserving) the units that they are asked for and reserve in turn the units of the necessary component items to compensate them. The operative replacement orders don't affect the rest of the items in the logistical system, as they use the corresponding component items progressively reserved by means of the previous process for the operative replacement orders.

Internally they handle their replacements with total independence with regard to the rest of the items in the logistical system. The characteristics and values of replacement in each item only affect the design of its own strategical environment, which is virtually transparent to the rest of the items in the logistical system and thus neither being affected by them nor affecting them. They periodically transform, with complete independence, the units of the items that as components have been progressively reserved into operative replacements, considering only their own values of the "RC" and their own strategic parameters "mRC" and "MRC".

It should be noted that the strategy discussed above for obtaining a reserve of directly associated component items necessary for replacing the "father" item (i.e., the directly associated higher level item) can be applied to obtain in each time period the forecasted internal demand that each "father" item will emit to these associated component items, as the increase of the forecasted internal demand emitted by the "father" item from the prior time period, the forecasted internal demand emitted by the "father" item in each time period being the difference between the maximum of the available inventory and/or replacement orders issued and still pending for this item and the remaining amount available of inventory and/or replacement orders issued and still pending for the item after the forecasted demand associated with the item depletes this amount. Mathematically:

$FIDe_{i-1} = MRC_{i-1} - RC_{i-1}$ $FIDe_i = MRC_i - (RC_{i-1} - FD_i)$ $\Delta FIDe_i = FIDe_i - FIDe_{i-1} = FD_i + (MRC_i - MRC_{i-1})$ where "$FIDe_{i-1}$" and "$FIDe_i$" are the forecasted internal demand emitted by the "father" item in each time period i-1 and i, "$MRC_{i-1}$" and "$MRC_i$" are the maximum amount forecasted by the "father" item in each time period i-1 and i, "$RC_{i-1}$" and "$RC_i$" are the reaction capacity remaining in the "father" item in each time period i-1 and i, and "$\Delta FIDe_i$" is the variation (increase) in forecasted internal demand emitted by the "father" item from the prior time period.

The above variation in forecasted internal demand emitted duly modified by flaws and structural relations became the forecasted internal demand received by each directly associated component item from the "father" item. This obtained forecasted internal demand received by each directly associated component item will update by adding the forecasted demand of each of these items.

5. Description of the Data Processing Method for Obtaining Replacement Proposals The "Data Processing" part of the present invention includes only some of the possible options, and may present other forms or mechanical sequences of development, but it expresses one of the possible practical developments of the philosophy of the invention by means of a series of "Data Processing Procedures," which are described below.

As discussed earlier, the strategical replacement parameters are the forecasted or strategical values and, as such, are calculated based on forecasts at each "PSi" point in the forecasted evolution of the items in the logistical system. These values will indicate at each future "PSi" the replacement conditions under which each item should be found or will have to be positioned, in order to meet the future forecasted demands, in accordance with the replacement criteria for each item. The strategical replacement parameters consist mainly of a direct derivation from the traditional Stock Replacement parameters. As such, they are based on the demand forecasts and on the Operating Parameters of each item, as if these items were separate and isolated. It is possible to calculate a sequence of values for these strategical replacement parameters which is as long as desired. However, the sequence should cover at least a time horizon which is equal to or greater than the longest time required by a commercial item in order to carry out the process involved in obtaining the item. The above values may remain stable as long as: 1) the Sales Forecasts are not modified, 2) the Operating Parameters are not modified, and 3) the number of values forecasted to cover the above-described horizon does not need to be changed.

On the other hand, since the demand expected to be received by an item may come either from the External Demand and/or internal demand when an item acts as a component, a repetitive, successive process will be established which will enable the total demand forecasted for an item, to be updated before proceeding to obtain the strategic replacement parameters, as described below.

a. UPDATING FORECASTED EXTERNAL DEMAND (FIG. 10a)

The Demand Forecast Vector (FD) is a vector corresponding to each item in the logistical system that records the values of the demand forecast for that item at each "PSi" point belonging to the chosen time horizon. One of the demands directly felt by the items in the system is that corresponding to the forecasted "External Demand". This demand will be the only forecasted demand felt by the level 1 items (highest level), in other words, those items which are not components of any other item.

Figures 9, 10A:
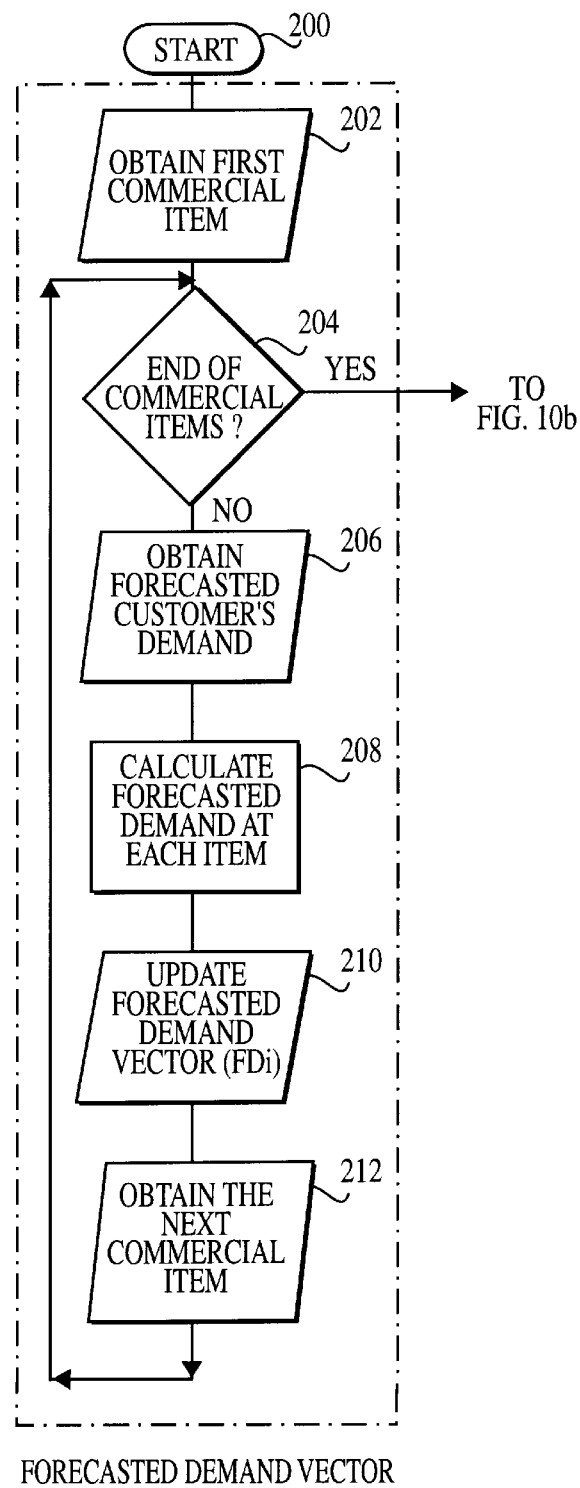
FIG. 9 is a flowchart of the combined process illustrated in FIGS. 10a–10c.
FIG. 10a is a flowchart which shows the sequence of operations for obtaining the Forecasted Demand from the Forecasted Customer Demand for commercial items.
Figure 10B:
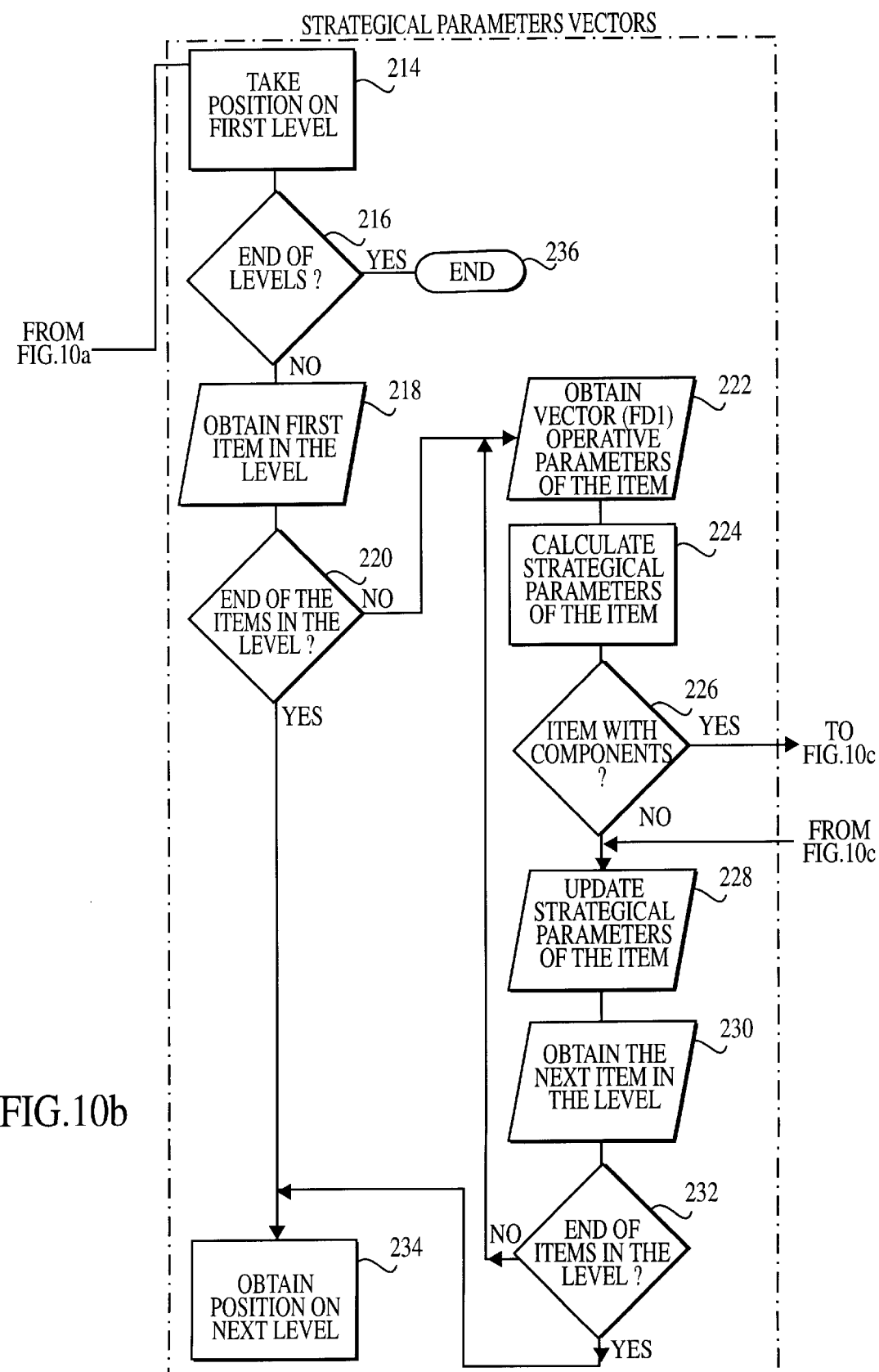
FIG. 10b is a flowchart which shows the sequence operations for obtaining the Strategical Parameters vectors of each item of the production environment.
Figure 10C:
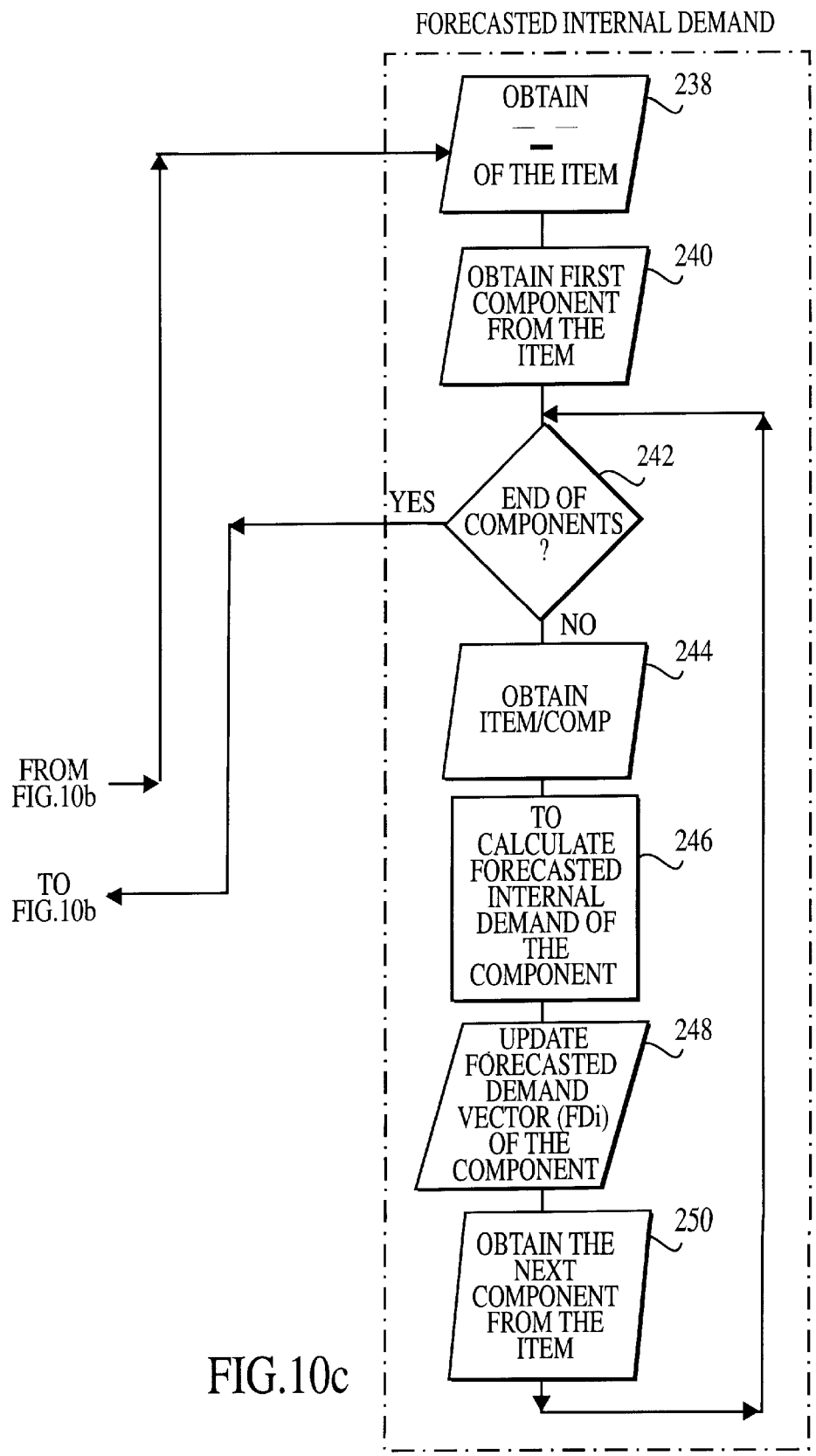
FIG. 10c is a flowchart which shows the sequence operations for obtaining the Forecasted Internal Demand for each item of the production environment as being direct component of other items, and make up its Forecasted Demand vector.

FIG. 9 is a flowchart of the combined process illustrated in FIGS. 10a–10c. Referring to FIG. 10a, the process starts at 200 at block 202, taking the first item identified as commercial (which should have a "Sales Forecast"), the following steps will occur when the end of the commercial items has not been reached at 204. First, the values of the forecasted demands contained in the "Sales Forecast" corresponding to the item will be obtained at block 206. At block 208 they are distributed proportionally over the (PSi) time periods, giving "$FD_i$". The FD vector of the item will be updated at block 210, using the corresponding "$FD_j$" values calculated in block 208.

Repeating the process for the rest of the commercial items (the order is irrelevant) at block 212 and block 204, we shall succeed in updating the vectors (FD) of each item, based on the external demand expected to be received in each "PSi".

b. UPDATING THE STRATEGIC REPLACEMENT PARAMETERS (FIG. 10b)

Based on the hypothesis that the items will receive and should immediately meet demands with similar characteristics to those described for the External Demand as if they were separate items isolated from the other items in the logistical system, the strategic replacement parameters for these separate items, as if they were isolated items, must be calculated in order to know "WHEN" and "HOW MUCH" to replace the items successively.

To obtain the best values for these parameters at each "PSi" point in the forecasted evolution of each item, it will be necessary to know the demand forecast contained in the vector FD, as well as the operating parameters. The operating parameters describe certain characteristics of the control and physical replacement operations for the items, within the items themselves. The operating parameters are:

| | | |
|---|---|---|
| RT | = | Replacement Type, |
| FRP | = | Fixed Replacement Period, |
| A | = | Total global time estimated for carrying out the replacement operation, |
| q | = | Replacement Batch Size, |
| SS | = | Safety Stock, |
| m | = | Fraction of items which have to be discarded as bad in a typical lot obtained by carrying out the replacement operation for the item, |
| $r_j$ | = | Number of units of component item "j" needed to obtain, by means of the replacement operation, one unit (good or bad) of the item. |

These variables will have been input directly from outside the system, or calculated separately.

Referring to FIG. 10b, taking the first item belonging to level 1 when the end of commercial items has been reached at 204 (which, therefore, will be a commercial item with its vector (FD) fully updated), at blocks 214, 218 and 220 when the end of levels has not been reached at 216. This vector (FD) is obtained when the end of the items in the level has not been reached at 220, and also its operating parameters at block 222. From these values, for each "PSi", forecasted strategic parameters $MRC_i$ and $mRC_i$ are estimated at block 224.

We now consider the two most common types of Stock Replacement: 1) Fixed Replacement Periods and 2) Order Point and Replacement Batch. The determination of when to order for the "Fixed Replacement Period" Replacement Type is based on the item's operative parameter "FRP". If the Replacement Type is "Order Point and Replacement Batch", the time to order is determined by the item's Potential Minimum Reaction Capacity (mRC), analytically calculated as:

$$mRC_i = \sum_{j=i+1}^{i+(A)} FD_j + SS$$

where:

(A)=A rounded down to a whole number of time periods [PSi].

The determination of how much to order is based on "MRC", which shows the maximum value of the available items in stock plus the replacement orders available, which has to be reached after each order replacement is launched.

For Fixed Replacement Period Replacement Type, $MRC_i$ is determined by:

$$MRC_i = \sum_{j=i+1}^{i+(A+FRP)} FD_i + SS$$

whereas for Order Point and Replacement Batch:

$$MRC_i = \sum_{j=i+1}^{i+(A)} FD_j + q + SS$$

where:

(A+FRP)=A+FRP rounded down to a whole number of time periods [PSi].

Once $mRC_i$ and $MRC_i$ have been calculated at block 224, a determination is made at block 226 as to whether the item has other items as components. Assuming that the item has other items as components, referring to FIG. 10c, the FD vectors of these component items will be updated in blocks 238 to 250. When the item has no components, the item's record will be updated at block 228 in order to collect the operations performed.

Referring to FIG. 10b, repeating the steps at blocks 222 to 228 for the rest of the items of the same level (blocks 230 and 232) when the end of the items in the level has not been reached at 232, the strategic parameters will be updated for all the items of this level, and also the vectors FD for all the items of the following level which are direct components of the analyzed ones will be updated with the forecasted demand which is expected from each analyzed item. Once the items of the current level are finished at 232, the first item of the following level at blocks 234, 218 and 220 will be taken. At that point, one will have updated all the forecasted demand (external and/or internal) expected for the items on the following level. One repeats the process until all the levels are finished, as determined by the test at block 216, and the process ends at 236.

c. UPDATING FORECASTED INTERNAL DEMAND (FIG. 10c)

Once the strategic replacement parameters of one item have been obtained at block 228 and whenever that this item has other items as components as determined at block 226, it will be necessary to calculate the increase of the forecasted internal demand which such item will emit to the items which act as its components. At every "PSi" and with these values it will update the vectors (FD) for the items which act as components with the forecasted demand which is expected from this analyzed item. In order to do so, this increase will be estimated as the internal demand forecasted which the item will emit to its components at every "PSi". FIDe (Forecasted Internal Demand emitted) is calculated according to the expression:

$$FIDe_i = FD_i + (MRC_i - MRC_{i-1}).$$

This operation occurs at block 238. Taking the first component of the item at block 240, the value "m" for the item and the value "$r_j$" for the component item j will be obtained during block 244. Using these quantities, the forecasted internal demand which this component item will "receive" in each "PSi", FIDr (Forecasted Internal Demand received), will be obtained during block 246 according to the expression:

$$FIDr_i = FIDe_i \times r_j \times (1+m)$$

The FIDr$_i$'s are added to the corresponding positions of the vector (FD) of the component item (block 248).

We repeat the process at blocks 244, 246 and 248, for the rest of the items which act as components of other items (at blocks 250 and 242) and when all components have been processed, the process moves to updating strategic parameters at 228.

Figure 11A:
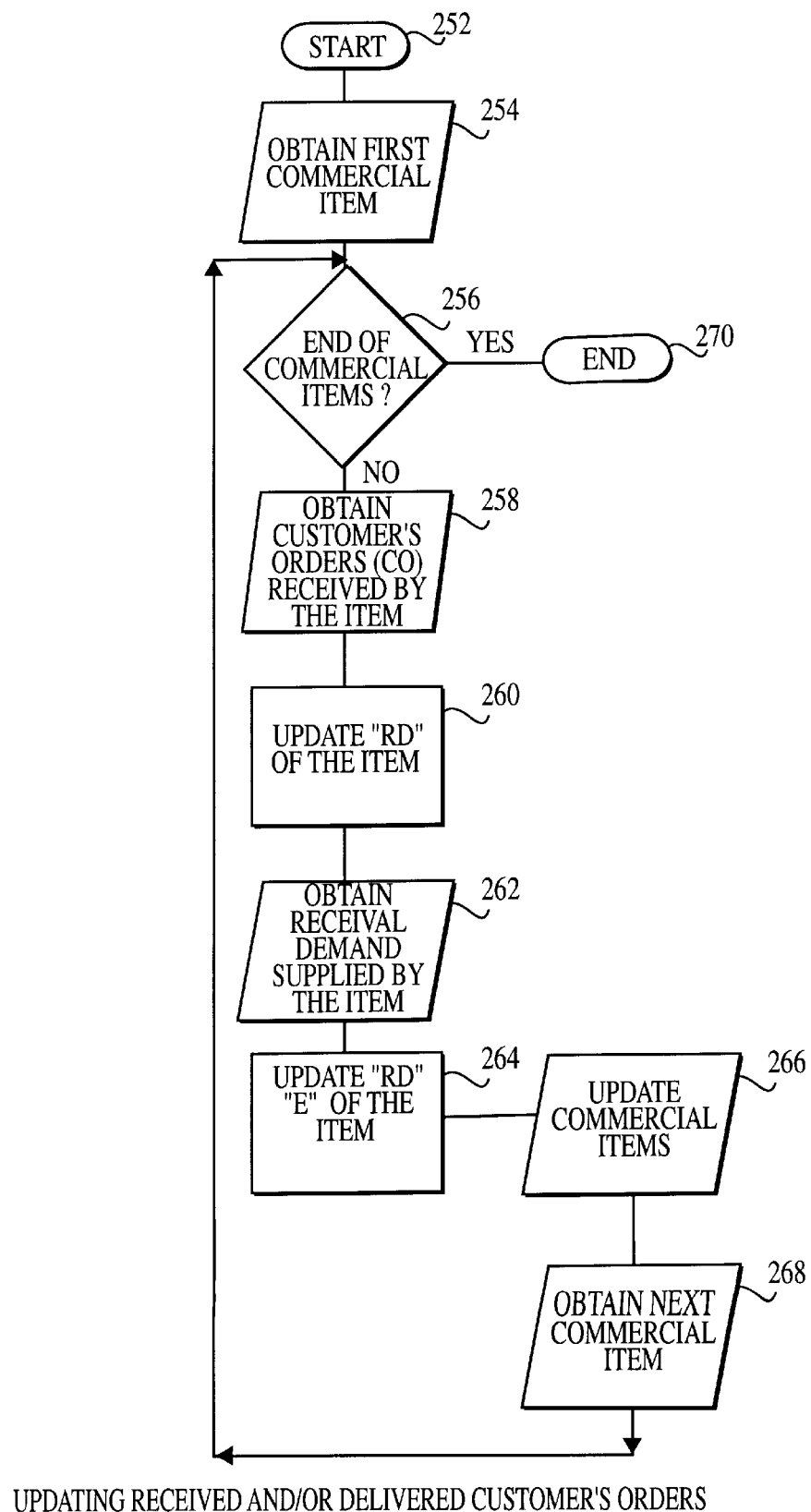
FIG. 11a is a flowchart which shows the sequence of operations for updating the inventory ($E_i$) and Backlog ($PD_i$) of each item of the production environment with the Customer Orders and/or Delivered Orders that has taken place during the system period [PSi] which has just ended.

It must be pointed out that on applying the factor "r$_j$" to the "FIDe", the result will be expressed in units of the component item.

d. UPDATING TO REFLECT EXTERNAL DEMAND (FIG. 11a)

A method and apparatus for obtaining data for improving the management of the logistical resources of a system has been described. The preferred embodiment of the invention does not itself encompass the administrative or computer control necessary for supporting the orders and controls of the physical operation of the enterprise. In fact, it is understood that the preferred embodiment of the invention will act in a complementary manner to an established process or one that is to be established for controlling the operation.

At the end of each time period (PSi) of actual evolution, in order to generate proposed replacement orders, it is necessary in accordance with the invention to determine certain quantities (PD, RC, etc.) listed below. These quantities should be calculated in accordance with the specific processes described below with reference to FIGS. 10 through 12, so that they can be compared with the values of the strategic replacement parameters forecasted for these time points in the actual evolution.

The first step in these calculations is updating to reflect external demand. Referring to FIG. 11a, the process starts at 252 at block 254, the first item identified as being commercial is obtained. The external demand received during the preceding period (PSi) will be obtained during block 258 when the end of commercial items has not been reached at 256 and with it the actual value of the Pending Demand (PD) for the item will be increased at block 260 by the amounts received as external demand. The external demand attended to during the above mentioned (PSi) period will be obtained at block 262 and the Pending Demand (PD) of the item will be decremented by that quantity, as will the actual quantity of the item in inventory (E) of the required units needed to supply the attended demand at block 264. Once the values of the pending demand (PD) and the inventory (E) have been modified, the record for the item will be updated during block 266 in order to reflect the new situation.

Repeating the process (blocks 258 to 266) for the rest of the commercial items as controlled by blocks 268 and 256, the record of every commercial item will be updated so as to take into account external demand experienced during the preceding time interval [PSi]. If any non-commercial item should receive external demand, this situation could be easily handled in the same way described above. The process ends at step 270 when the end of commercial items has been reached at 256.

e. UPDATING TO REFLECT ACTUAL REPLACEMENT ORDERS ISSUED (FIG. 11b)

Figure 11B:
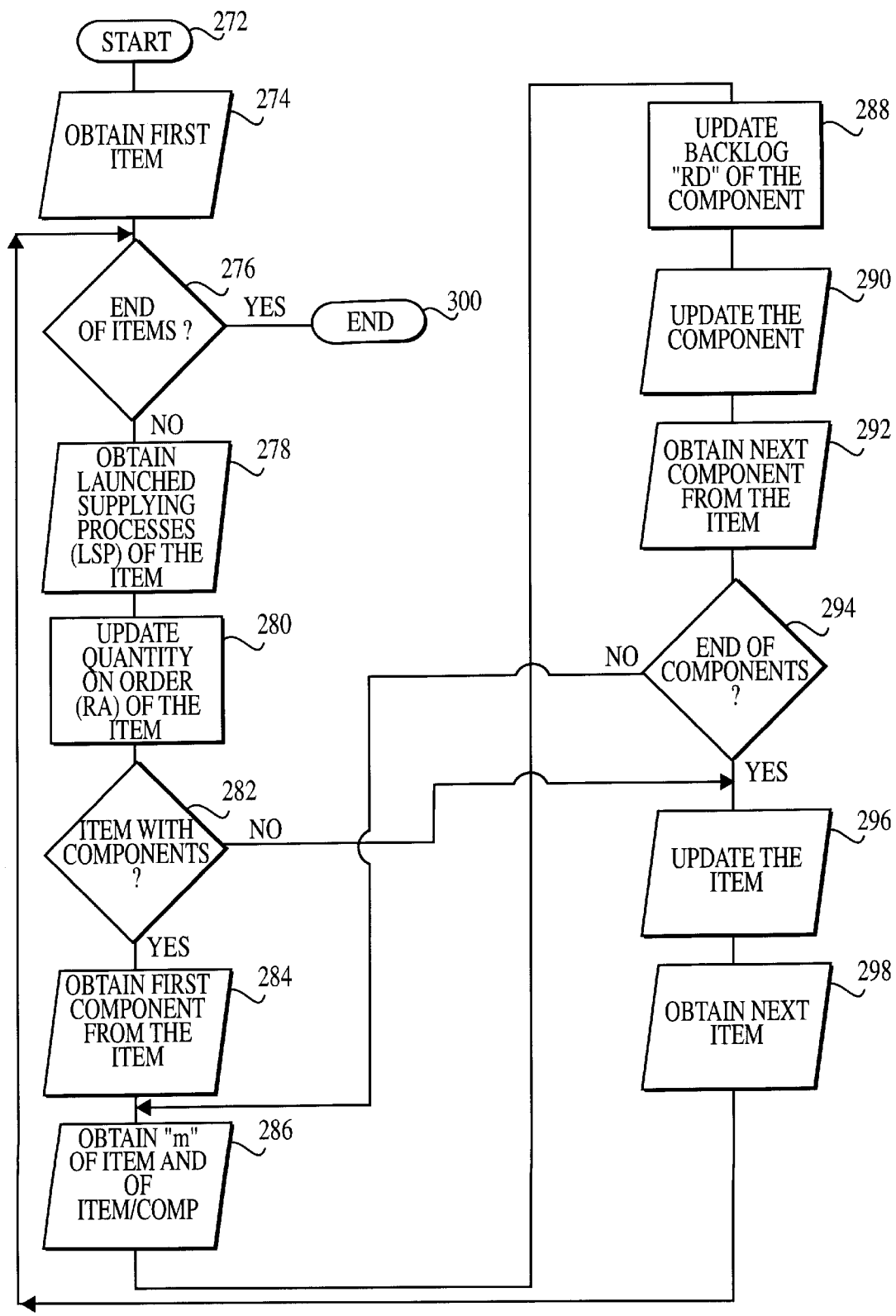
FIG. 11b is a flow-chart, which shows the sequence of operations for updating the Quantity on Order ($RR_i$) of each item of the production environment and the Backlog ($PD_i$) of each item which acts as its direct component, if any, with the Supplying Process just launched, during the system period [PSi] which has just ended, for said item.

Referring to FIG. 11b, the process starts at 272, and the first item of the logistical system is obtained at block 274. The total number of units corresponding to the replacement orders launched during the period [PSi] will be obtained during block 278 when the end of items has not been reached at 276. During block 280 the actual value of the replacement orders (RR) pending in the item will be increased by that total number of units. Then, during block 282, a determination is made as to whether the item has other items as components. The first item which acts as a component will be obtained at block 284, and then the value "m" for the item and the value "r$_j$" for the component item will be obtained during block 286.

Pending Demand (PD) is calculated at block 288 as the units from the component items required to obtain the replacement orders (RR) issued, according to the expression:

$$PD = RR \times r_j \times (1+m)$$

The actual value of the Pending Demand (PD) of the component item will be updated at block 290 by adding the calculated value of "PD". It must be pointed out that on applying the factor "r$_j$" to "RR", the result will be expressed in units of the component item. By repeating the process (at blocks 286, 288 and 290) for the rest of the items which act as components of the item (at blocks 292 and 294)—in any order—the Pending Demand, which reserves the units of the component items needed to realize the launching orders, will be updated.

Once this has been accomplished (regardless of whether the item has got other items as components or not as detected at block 282), this process will be repeated (at blocks 278 to 294) for the rest of the items in the logistical system (as controlled by the tests at blocks 296 and 276) in any order, until all items have been processed at 276, at which time the process ends at 300. As a result, the Replacement Orders (RR) pending and the Pending Demand (PD) in all the items affected by the issued orders will be updated in 296 the next item obtained in 298.

In case there is an item for which no order was issued during the period [PSi], this would only imply a trivial change in the foregoing method, requiring an updating with zero from the steps at blocks 280 to 296 and/or adding an additional test in block 278 resulting in a direct jump to 296.

f. UPDATING TO REFLECT COMPLETED REPLACEMENT ORDERS (FIG. 11c)

Figure 11C:
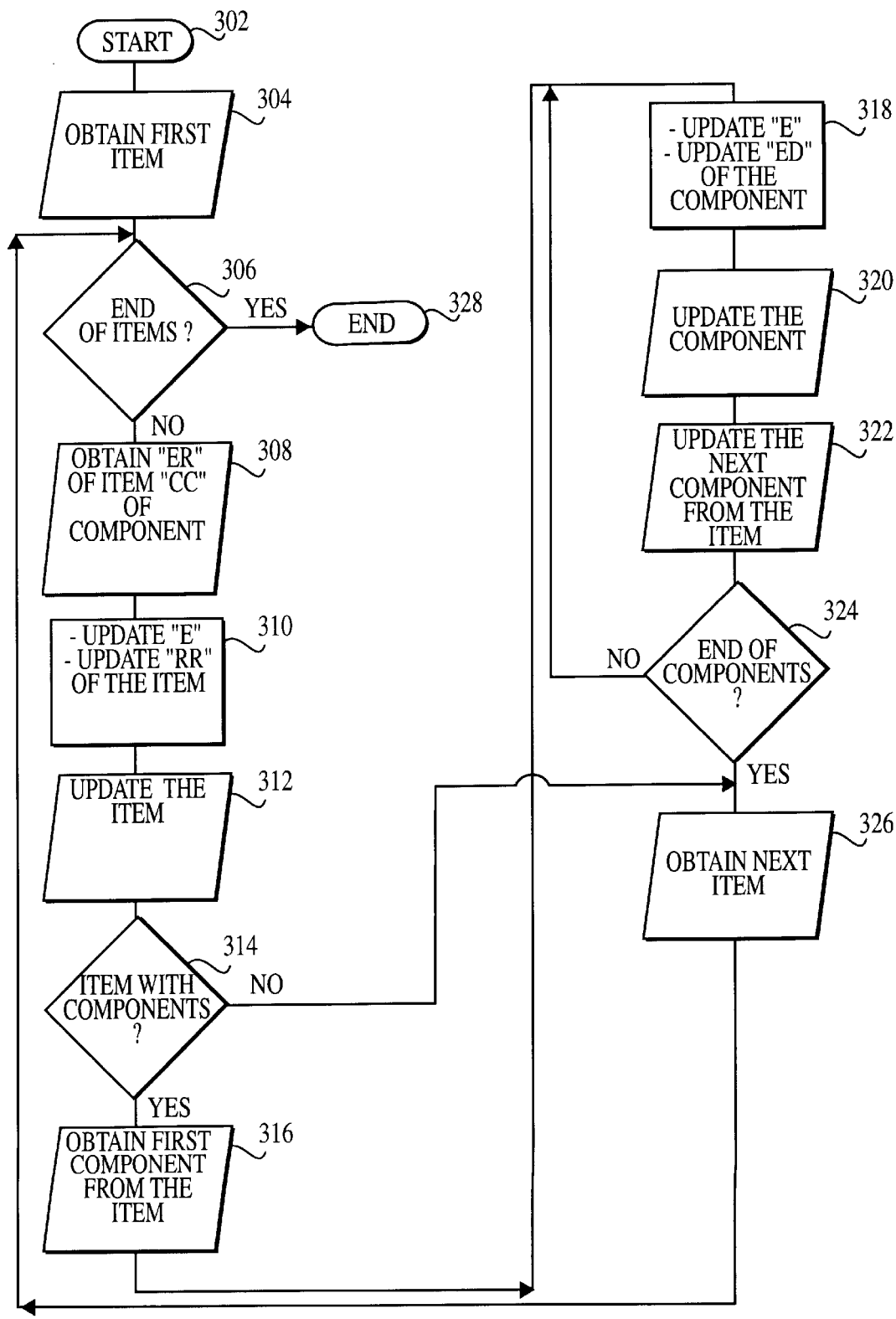
FIG. 11c is a flowchart which shows the sequence of operations for updating the Quantity On Order ($RR_i$) of each item of the production environment and the inventory ($E_i$) and Backlog ($PD_i$) of each item which acts as its direct component, if any, with the Incoming Units received as supply for said item and with the Outgoing Units of each of said direct components, used for making up said Supplying Process, both having occurred during the system period [PSi] which has just ended.

Referring to FIG. 11c, the process starts at 302 the first item is obtained during block 304. The total number of units ER received from completed replacement orders will be obtained, as well as the number of units coming out from the component items needed to produce them at block 308 when the end of items has not been reached at 306. With the values of these inputs, inventory E and pending demand P are updated at block 310.

The actual value of the inventory (E) is increased by ER, i.e., E=E+ER (310, FIG. 11c). The actual value of the Replacement Orders (RR) pending will be decreased by ER, i.e., RR=RR−ER (310, FIG. 11c), where ER=units received from completed replacement orders. The recorded values of the inventory (E) and of the Replacement Orders (RR) will be updated at block 312 in order to reflect the new situation.

If the current item is determined to have other items as components at block 314, the first component item of the current item will be taken at block 316. The number of units CC of the component item used to fulfill the replacement order is obtained in block 308. The actual value of the inventory (E) will be decreased by CC, i.e. E=E−CC (block 318, FIG. 11c). The actual value of the Pending Demand (PD) will be also decreased by CC, i.e., PD=PD−CC (block 318 FIG. 11c). Then the recorded values of the inventory (E) and the Pending Demand (PD) will be updated at block 320 in order to reflect the new situation of the item. The process will be repeated at blocks 318 to 322 for the rest of the component items of the item, and in this way the final value of the inventory and the Pending Demand will eventually be dated due to the incorporation of such item.

Once this updating has been accomplished (regardless of whether the item has other items as components or not, as detected at block 314), this process will be repeated at blocks 308 to 324 for the rest of the items in the logistical system (blocks 326 and 306) until these items are completed at 306, at which time the process ends at 328. As a result, the value of the inventory (E) and the Pending Demand (PD) as well as the Replacement Orders (RR) pending, in all the items affected by completed replacement orders and the items used as components to fulfill those orders during the period [PSi], will be updated. If there is an item without any completed replacement order during the period [PSi], this would imply a trivial modification in the described process, which can be handled as an updating with zero in the steps at blocks 310 to 324, or as an additional test in block 308 resulting in a direct jump to block 326.

g. UPDATING ACTUAL INTERNAL DEMAND (FIG. 12)

At the end of each time period (PSi) during which the real operative actions have taken place and assuming that these have been recorded, the following will occur: the external demand received will have changed the inventory and/or Pending Demand of the commercial items. The issuance and/or completion of the replacement orders will have updated the inventory as well as the pending Replacement Orders of the items, and also the inventory and the Pending Demand when the item acts as a component.

A further update is required: that of the internal demand (ID) with the units that each item, as a component, has to reserve in order to allow potentially the "father" item's "RC" to be topped up so that the "RC" value reaches its maximum value "MRC".

Figure 12:
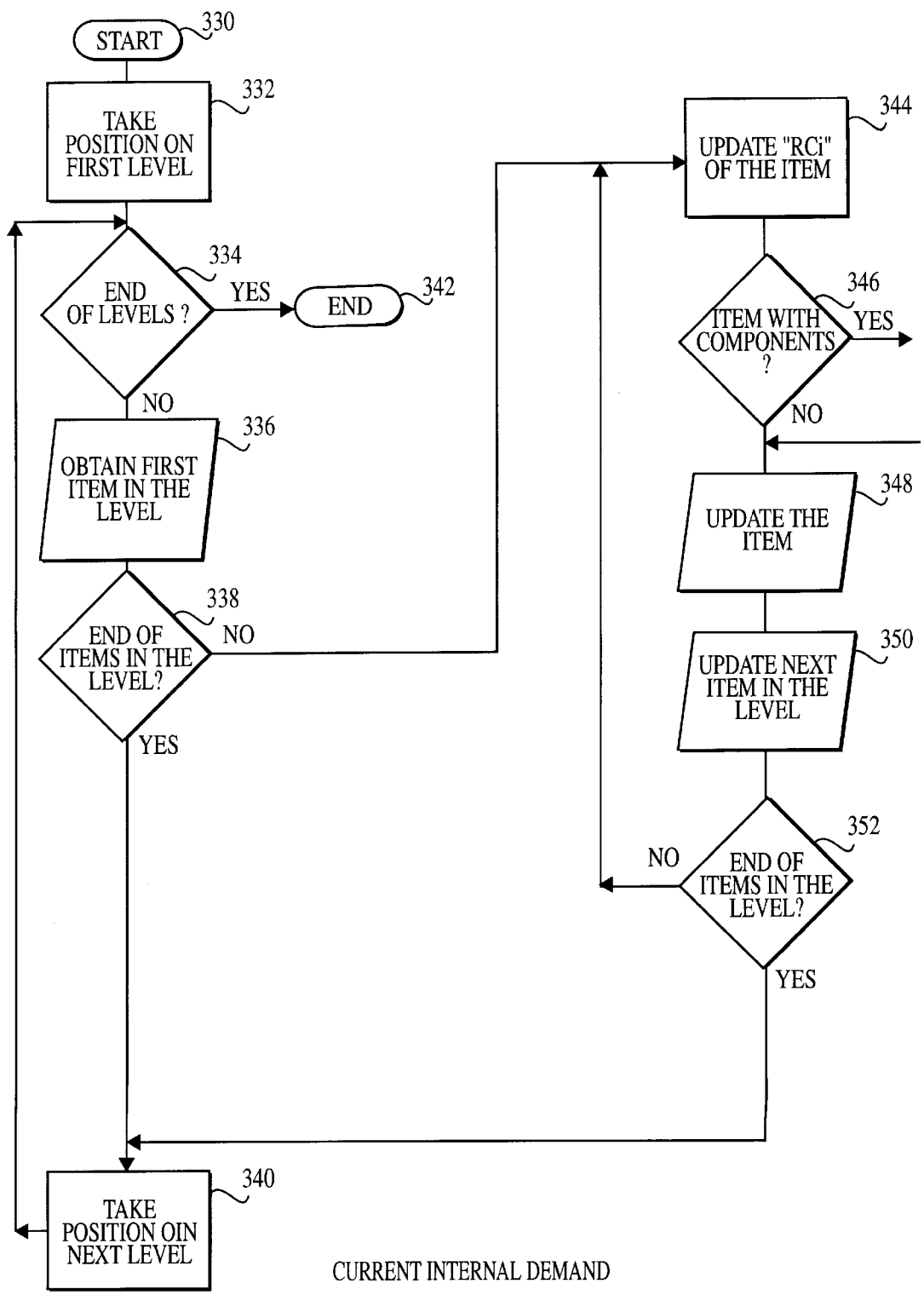
FIG. 12 is a flowchart which shows the sequence of operations for updating the current Internal Demand ($ID_i$), generated by an item to each of the items which act as its direct components, and for making up the Reaction Capacity ($RC_i$) of said item.
Figure 12:
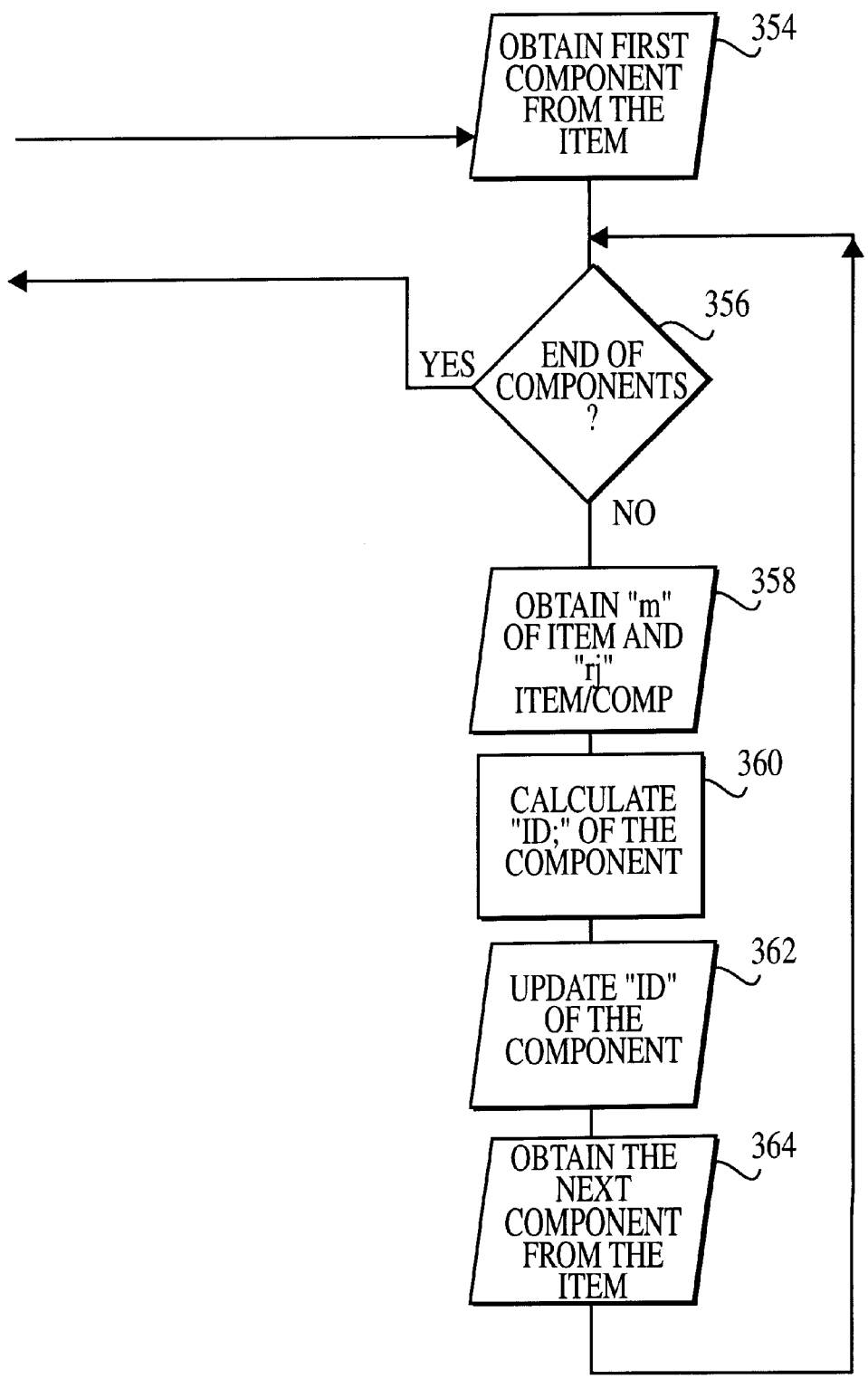
Figure 13:
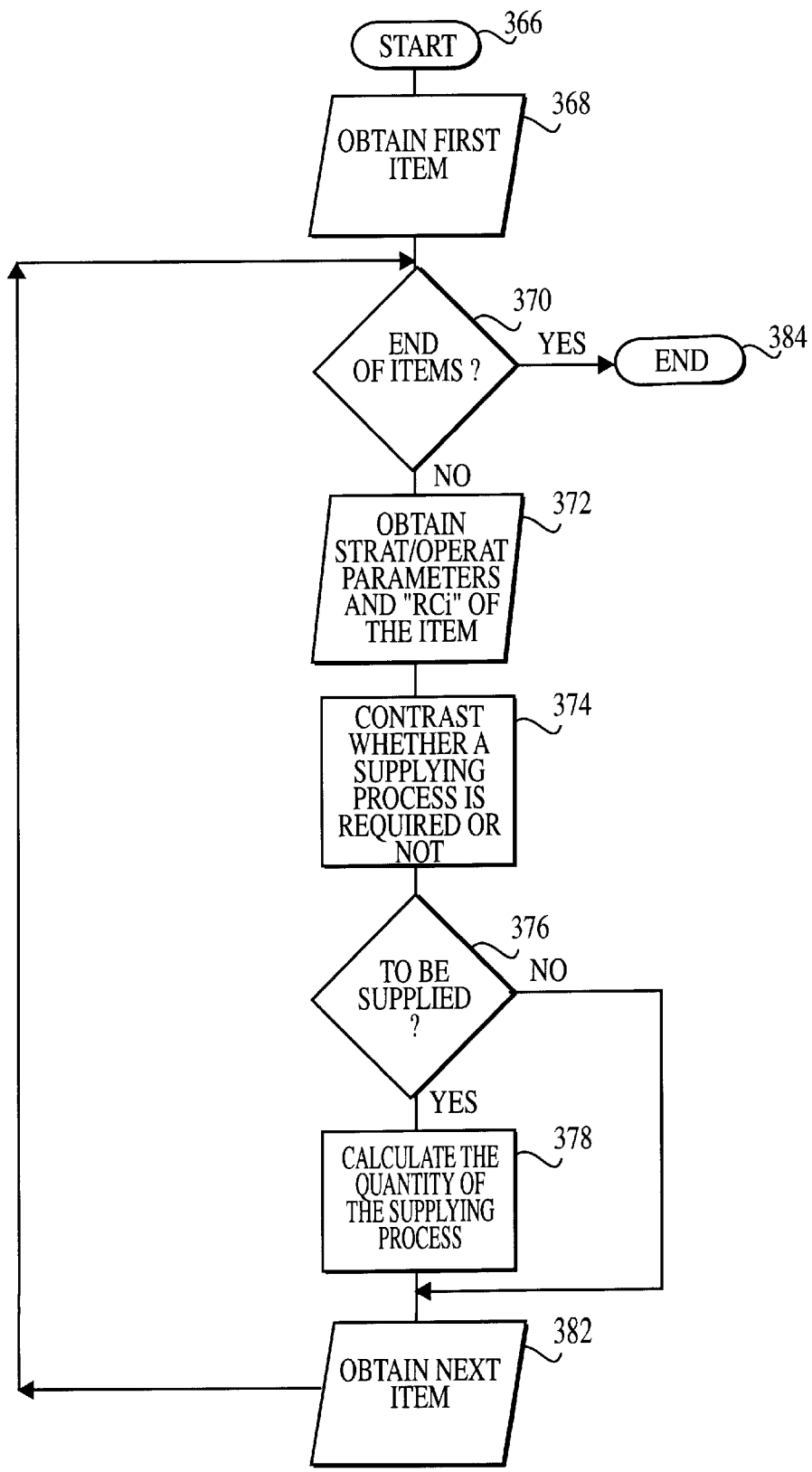
FIG. 13 is a flowchart which shows the sequence of operations for determining whether it is necessary or not to launch a new Supplying Process (an Operative-Supplying-Processes' Proposal) for each item of the production environment at said specific control date "PSi" (WHEN), and the quantity of it (HOW MUCH), if it is the case.
Figure 14:
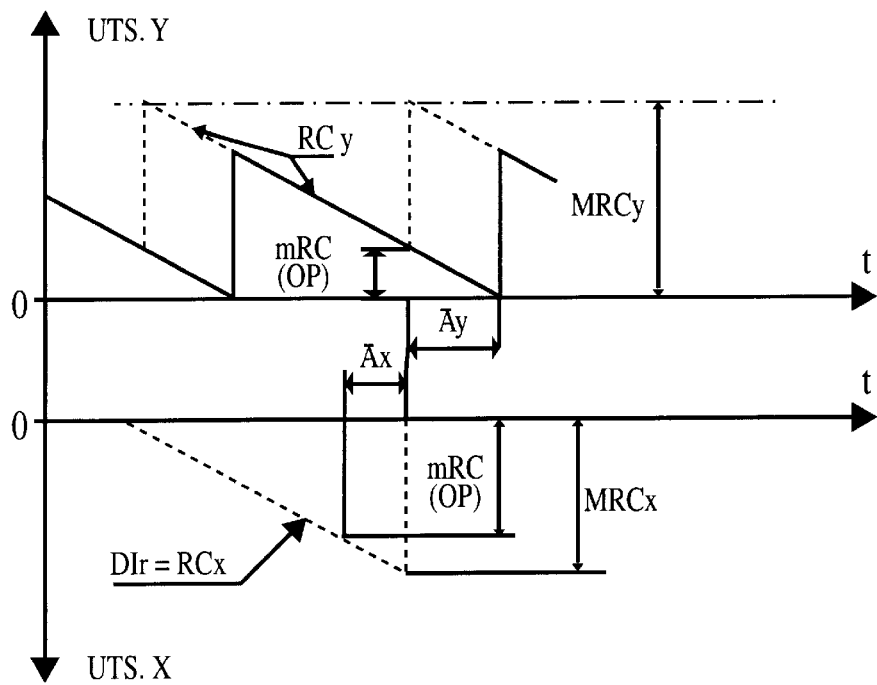
FIG. 14 illustrates the internal reserve of components which form a strategic environment of an item until its value reaches a critical point and shows when the launching of the components must take place so that they can be "just in time"

Referring to FIG. 12, the process starts at 330, and the first item at level 1 at blocks 332 and 336 will be obtained when the end of levels has not been reached at 334, and the Reaction Capacity (RC) will be calculated by the following expression at block 344 when the end of items in the level has not been reached at 338:

$$RC=E+RR-PD-ID$$

where ID is the updated value of the Internal Demand received from other items, in units (see blocks 360 and 362). For the items at level 1, the value of ID will be equal to zero, since these items are not components of any other item.

When the item is determined to have other component items at block 346, the internal demand emitted IDe is determined. IDe will be calculated as the units which are missing to top "RC" up to "MRC" as forecasted for this time point "PSi", according to the expression:

$$IDe=MRC-RC.$$

The first item which acts as a component of the item at block 354 is taken, obtaining then at block 358 the value "m" for the item and the value "$r_j$" for the component item. The internal demand IDr which other component items will receive from the item will be calculated at block 360, according to the expression:

$$IDr=IDe \times r_j \times (1+m),$$

thereby increasing the actual value of the internal demand "ID" of the component item. After that, this component item's record is updated in order to reflect the new situation at block 362. Repeating the steps at blocks 358, 360 and 362 for the rest of the items which act as components of the item at blocks 364 and 356, the value of the internal demand which so far has affected these component items of the previous item is now updated.

Whether the item currently being processed has other items as components or not, the record of the item will be updated at block 348 in order to reflect the new value of its Reaction Capacity (RC). Repeating the process at blocks 344 to 348 for the rest of the items of the current level (as controlled by blocks 350 and 352), the value of the "RC" for all the items of this level will be updated. Moreover the value of the "ID" for all the items which are direct components of the previous ones will also be updated with the internal demand received from the items of the current level.

Once the items of the current level are finished as determined at 352, the first item of the following level at blocks 340, 336 and 338 will be taken, repeating the process until block 334 when all the levels are completed determined at 334, at which time the process ends at 342. The above-described process requires that the initial value of the internal demand be equal to zero for all the items in the logistical system.

h. CALCULATION OF ACTUAL REPLACEMENT PROPOSALS (FIG. 13)

Following the previously mentioned process involved in updating the internal demand, and assuming that the value of inventory, Replacement Orders in process, and Pending Demand have been updated correctly, we now know the Reaction Capacity (RC) of each item in the logistical system to meet future demands. Now this Reaction Capacity (RC) corresponding to the item can be compared with the Strategic Replacement Parameters forecasted in each "PSi", in order to know the replacement needs for that item which will allow it to meet the future demand.

Preferring to FIG. 13, the process begins at 366, and taking the first item among all those in the logistical system at block 368 and also taking its Strategic Replacement Parameters corresponding to the current "PSi" in block 372 and its actual Reaction Capacity (RC) when the end of items has not been reached at 370, it will be possible to determine "WHEN" this item should be replaced at block 374 according to the following process. If the item's Replacement Type is Fixed Replacement Period, a replacement order is proposed if the "PSi" where the determination is taking place coincides with the "FRP" of such item. If the item's Replacement Type is Order Point and Replacement Batch, a replacement order is proposed if the value of its "RC" (Reaction Capacity) is less than or equal to its "mRC" (Minimum Reaction Capacity) forecasted for this "PSi".

If one decides to replace the item at block 376, the quantity to order is calculated at block 378, according to the expression:

$$PR=MRC-RC$$

"PR" being the value in units proposed to replace the item at this stage "PSi". The proposal "PR" will be emitted at block 380.

Once blocks 372 through 380 have been executed for the current item (regardless of whether the item has to be replaced or not as determined at block 376), this process will be repeated by going through blocks 372 to 380 for the rest of the items in the logistical system (as controlled by blocks 382 and 370) until all the items are finished determined at 370 at which time the process ends at 384. As a result, the proposals for all the items in the logistical system necessary in this "PSi" will have been obtained.

The invention has been described in an exemplary and preferred embodiment, but it is not limited thereto. Those skilled in the art will recognize that a number of additional modifications and improvements can be made to the invention without departure from the essential spirit and scope.

For example, a number of different software techniques and any number of software languages would be suitable for implementing the disclosed invention.

E. ALTERNATIVE DESCRIPTION OF THE PREFERRED EMBODIMENT

An alternative description of the preferred embodiment the invention (also referred to as the "proposed system") is as follows.

1. Hierarchical Global Structure of Levels

Before the first application of the proposed system and whenever the number or composition of the Product Trees are modified, a Hierarchical Global Structure for each item's level in said production environment will have been carried out.

The updated level will be stored by the proposed system as another Operative Parameter of the item.

2. Strategical Parameters Vectors

Periodically (preferably once a month), the values of the Strategical Parameters of each item corresponding to each $SP_i$ control date in the next 12 months (preferably), are obtained by means of the following process and are stored by the proposed system as a Strategical Parameters vector.

a. Structuring of Forecasted Commercial Demand.

Each time the Strategical Parameters of each item have to be recalculated, the Forecasted Demand vector ($FD_i$) of each and every one of the commercial items is updated. This vector os be updated by distributing the monthly values of the Forecasted Customer Demand (assumed updated and received by the proposed system as an Operative Parameter of the commercial items), proportionally to the dates of each future system period [$SP_i$].

b. Strategical Parameters.

Next, a process takes place, level by level, through which, starting with all items of the higher levels and going successively through all items of the lower levels, the following is done:

On the basis of the Forecasted Demand vector ($FD_i$), just obtained for an item, and based on that item's Operative Parameters, its Strategical Parameters are then calculated for each $SP_i$ control date, from the current $SP_i$ control date onwards, with regard to its given Replenishment Type, given as an Operative Parameter.

FOQ (Fixed Order Quantity) Replenishment Type.

$$mRC_i = \sum_{j=i}^{i+A+[SP_i]} FD_j + SS_i$$

$$MRC_i = mRC_i + q$$

FIR (Fixed Interval Reorder) Replenishment Type.

$$MRC_i = \sum_{j=i}^{i+A+FIR} FD_j + SS_i$$

IFOQ (Inducted Fixed Order Quantity) Replenishment Type.

$$mRC_i = \sum_{j=i}^{i+A+[SP_i]} FD_j - q + SS_i$$

$$MRC_i = mRC_i + q$$

Figure 1A:
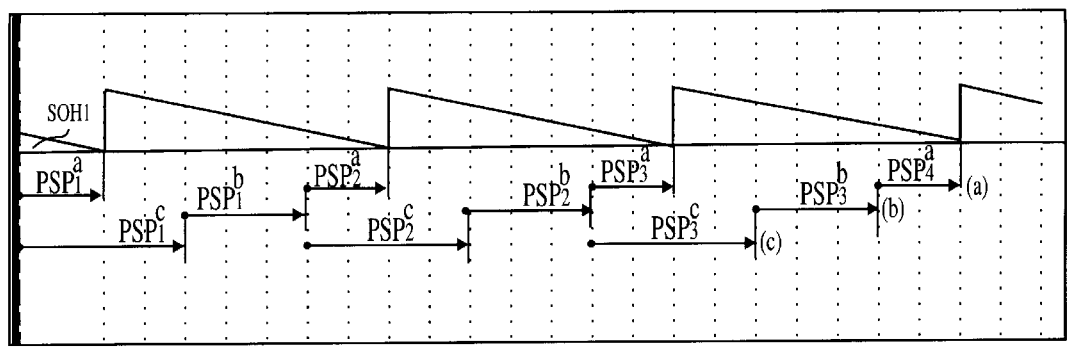
FIG. 1a is an illustration of an MRP system, simulating the forecasted Stock On Hand of a commercial item (A), from a starting point (with $SOH_1$ units in stock) onward, assuming a continuous demand, and obtaining the Planned Supplying Processes of said item (A) and its components (b) and (c)
Figure 1B:
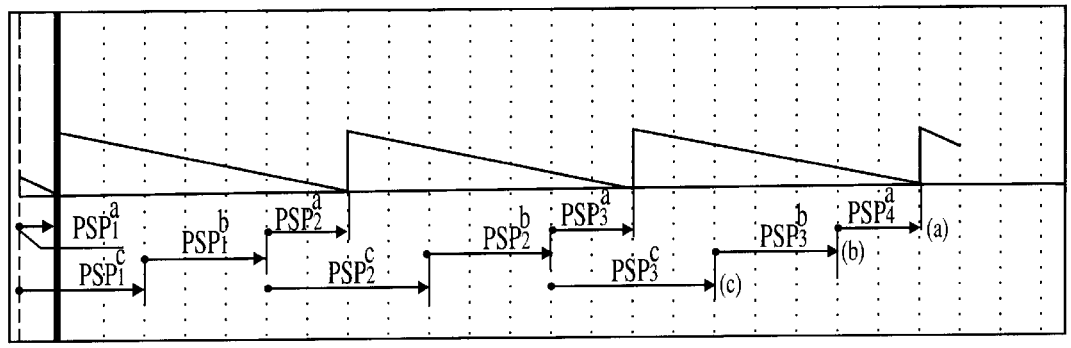
FIG. 1b shows once again the preceding FIG. 1a, but this time supposing that a period of time has gone by from that preceding starting point, during which has been received a demand from customers higher than expected.
Figure 2A:
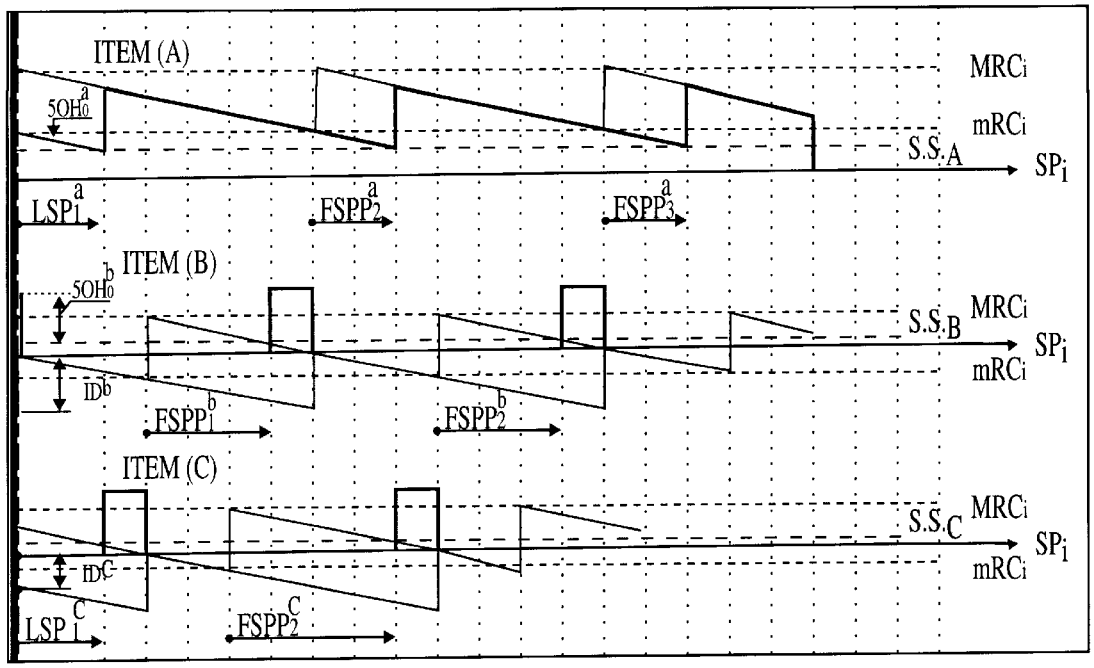
FIG. 2a shows the same items and situation of FIG. 1, but simulating the forecasted Stock On-Hand of the commercial item (A), and obtaining the Operative and Forecasted Supplying-Processes' Proposals of said item (A) and its components (b) and (c), through the application of the proposed system.
Figure 2B:
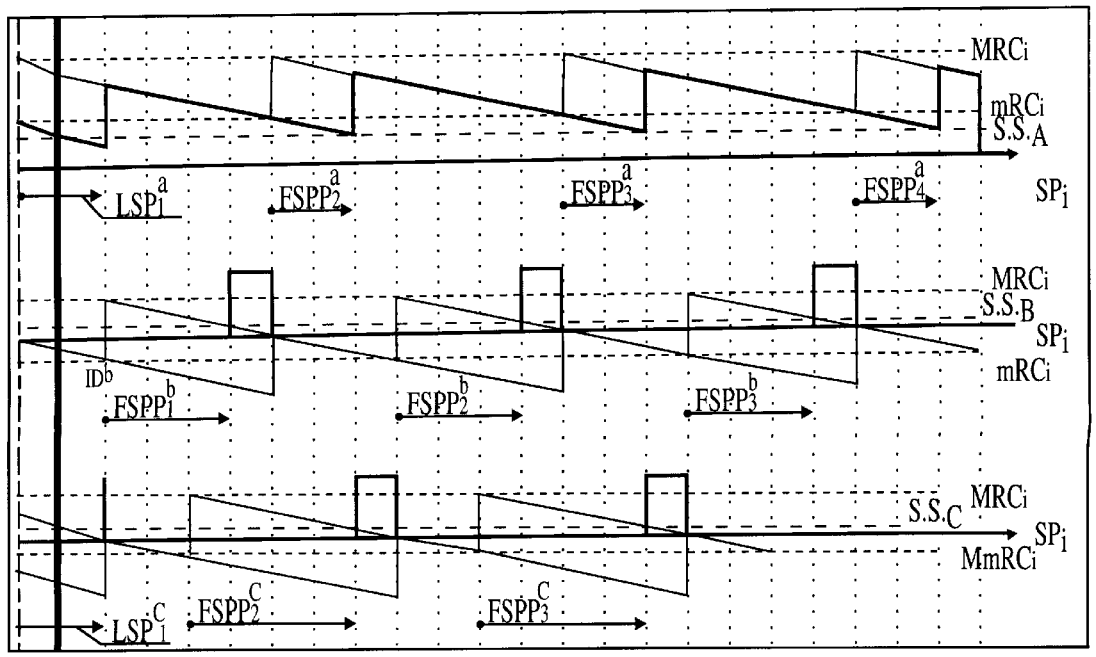
FIG. 2b shows the preceding FIG. 2a, but supposing that a period of time has gone by from the preceding starting point, during which has been received a demand from customers higher than expected. The Operative and Forecasted Supplying-Processes' Proposals are dynamically updated at said higher real demand, without dysfunctions over the Supplying Processes, already launched at said starting point.

(See in FIGS. 2a and 2b an example of this IFOQ. FIG. 2a shows the same items and situation of FIG. 1, but simulating the forecasted Stock On-Hand of the commercial item (A), and obtaining the Operative and Forecasted Supplying-Processes' Proposals of said item (A) and its components (b) and (c), through the application of the proposed system. FIG. 2b shows the preceding FIG. 2a, but supposing that a period of time has gone by from the preceding starting point, during which has been received a demand from customers higher than expected. The Operative and Forecasted Supplying-Processes' Proposals are dynamically updated at said higher real demand, without dysfunctions over the Supplying Processes, already launched at said starting point.)

NOTE. The purely commercial items cannot be assigned the IFOQ Replenishment Type.

If the item in question (h) has one or more items (k) which are its direct components, the Forecasted Internal Demand value which that item (h) generates is obtained as a forecast, for each said direct component (k), at each future system period [$SP_i$], by calculating:

$$FID_i^k = [FD_i^h + (MRC_i^h - MRC_{i-1}^h)] \times (1+m) \times r_{h-k}$$

Each foregoing corresponding Forecasted Internal Demand ($FID_i^k$) expected to be received by each of said items (k) from said analyzed item (h), is added to the corresponding values of the Forecasted Demand vector ($FD_i^k$), of each of said items (k). That is:

$$FD_i^k = FD_i^k + FID_i^k$$

NOTE. Once this process is been carried out for all the items at the highest level, the same process is repeated for all the items associated to the next lower level, and so on successively with all the items in the given production environment.

Before starting each new process to obtain the Strategical Parameters of each item, the Forecasted Demand vector stored by the proposed system must be set equal to zero.

3. Operative-Supplying-Processes' Proposals.

At the end of each system period [$SP_i$] ($SP_i$ control date) during the operation of said production environment, one determines, for each item of the given environment, whether a Supplying Process must be launched or not for each of said items at said $SP_i$ control date, and in that case, the quantity of that item to be ordered. The steps used to carry this out are as follows:

Current Operating Values. The Operating Values of Stock On-Hand (SOH); Backlog (B) and Quantity on Order (QO), stored by the proposed system for each and every one of the items, are updated to reflect the actual events which occurred during the just finished system period [SP], that respectively affect each of said items. These events are Customer Orders received and/or delivered and Supplying Processes launched and/or received.

NOTE. The proposed system stores again the updated Operating Values of each said item.

Current Internal Demand (ID). Once the current Operating Values for all items of the given production environment have been fully updated at a specific $SP_i$ control date, the current Internal Demand received by each of said items which is a direct component of other items is updated through the following process, level by level, starting with the items associated with the highest level and continuing with the items associated successively to each lower level:

The Reaction Capacity of each of the level 1 items is updated with that item's updated Operating Values and its updated Internal Demand received (which must be equal to zero because those items are at the highest level).

$$RC_i = SOH_i - B_i + QO_i - ID;$$

If the item in question (h) has one or more other items as its direct component (k), the current Internal Demand received ($ID_i^k$) for each of said items as components (k) from the item (h) is obtained by calculating:

$$ID_i^k = (MRC_i^k - RC_i^h) \times (1+m) \times r_{h-k}$$

The current Internal Demand ($ID_i^k$) just mentioned, received by each said item (k) which is a direct component of the item in question (h), is added to the corresponding stored value of Internal Demand ($ID_i^k$) of each of said items (k).

$$ID_i^k = ID_i^k + (MRC_i^h - RC_i^h) \times (1+m) \times r_{h-k}$$

NOTE. Once this process is carried out for all the items at the highest level, the same process is repeated for all the items associated to the next lower level, and so on successively with all the items in the given production environment.

At each starting of said process at each new $SP_i$ control date during the real operating process of said production environment, the Internal Demand value of each item, stored by the proposed system, must be set equal to zero.

Operative-Supplying-Processes Proposals. Once the respective Reaction Capacity of all the items has been fully updated at said specific $SP_i$ control date during real operating, the necessity or not of launching a new Supplying Process at each of said items at said $SP_i$ control date and the quantity of it, if it is necessary, (determining Operative-Supplying-Processes Proposals) are obtained by the following individual processes with the respective values of the Strategical and/or Operative Parameters of each said item and its updated Reaction Capacity.

| WHEN | |
|---|---|
| FOQ Replenishment Type: if $RC_i$ < | $mRC_i$ |
| IFOQ Replenishment Type: if $RC_I$ < | $mRC_i$ |
| FIR Replenishment Type: if i = | n × FIR |
| HOW-MUCH | |
| FOQ Replenishment Type: $OSPP_i$ = | $(MRC_i - RC_i)$, |
| (rounded downward to a multiple of q) | |
| IFOQ Replenishment Type: $OSPP_i$ = | $(MRC_i - RC_i)$ |
| (rounded downward to a multiple of q) | |
| FIR Replenishment Type: $OSPP_i$ = | $(MRC_i - RC_i)$ |

NOTE. The proposed system does not launch automatically the Operative-Supplying-Processes Proposals that it has determined to be necessary, but preferably reports the quantity and reasoning behind its computation of said necessary Supplying Processes so that said Supplying Process can be supervised and immediately launched by a responsible person.

In any case, the launching of said Supplying Processes must take into account the automatic reservation of the items acting as direct components, if any, in said Supplying Processes in order not to conflict with the proposed system.

What is claimed:

1. A method for controlling inventory resupply processes in a company by means of a computerized production controller, where said company stocks a first plurality of items, said first plurality of items including a second plurality of said items which are manufactured within the company, said method comprising the steps, carried out for each item in said first plurality of items, of:

determining the amount of physical inventory on hand;

computing the sum of said physical inventory and the sum of all pending orders for additional supplies of said item which have not yet arrived;

subtracting from the result of the preceding step the sum of all pending orders for said item from customers which have not yet been fulfilled;

subtracting from the result of the preceding step an estimate of the internal demand within said company for said item to determine a reaction capacity;

computing for said item a minimum reaction capacity; and initiating a resupply process for said item when said reaction capacity stands in a predetermined relationship to said minimum reaction capacity.

2. The method of claim 1, further comprising the step of computing said estimate of the internal demand for said item in said first plurality of items, said step comprising the steps of:

determining a third plurality of items consisting of all second items j which said item is used to manufacture;

for each second item j in said third plurality of items, determining the number of units of said item which are needed to manufacture one unit of said second item j, and multiplying said number of units by an estimate of a desired increase in the inventory of said second item j; and computing said estimate of the internal demand for said item as the sum of the products computed in said multiplying step.

3. The method of claim 2, where said estimate of a desired increase in the inventory of said second item j is the difference between a maximum desired reaction capacity for said item j and a reaction capacity for said second item j.

4. The method of claim 3, where said maximum desired reaction capacity for item j is computed as a function of said minimum reaction capacity for item j and a replacement batch size for item j when item j has a replacement batch size assigned to it.

5. A method for controlling inventory resupply processes in a company by means of a computerized production controller, where said company stocks a first plurality of items, said first plurality of items including a second plurality of items which are manufactured within the company, said method comprising the steps, carried out for each item in said first plurality of items, of:

computing for said item a reaction capacity indicative of the ability of the inventory of said item to react to demand;

computing for said item a minimum reaction capacity; and initiating a resupply process for said item when said reaction capacity stands in a predetermined relationship to said minimum reaction capacity;

where said minimum reaction capacity for said item is a function of: a forecast of the demand for said item during the maximum time that is predicted to elapse during a reaction time for said item, said reaction time for said item being an estimate of the amount of time which would elapse between (i) the occurrence of a difference between real and forecast demand such that a resupply process for said item should be initiated and (ii) the arrival of a new supply of said item to compensate for said difference; and a safety stock for said item.

6. A method for controlling inventory resupply processes in a company by means of a computerized production controller, where said company stocks a plurality of items at a set of locations, said set of locations comprising factories, warehouses, and points of sale controlled by said company, where said inventory resupply processes comprise purchasing items from outside suppliers, transporting items from one location to another, and manufacturing items from other items, where time is divided into a plurality of time periods called system periods, where the start of each system period in said plurality of time periods is called a control date, where for each item j in said plurality of items a set of control dates corresponding to item j is chosen, said method comprising the steps, performed at a current control date, of:

identifying a time horizon called a planning period beginning at said current control date; computing for each item j in said plurality of items and for said current control date and each future control date i in said planning period a minimum reaction capacity for item j on said control date i and a maximum reaction capacity for item j on said control date i;

computing for each item j in said plurality of items a current reaction capacity, said current reaction capacity being indicative of the ability of the inventory of item j to react to demand, said current reaction capacity being computed by determining the amount of physical inventory on hand; computing the sum of said physical inventory and the sum of all pending orders for additional supplies of said item which have not yet arrived;

subtracting from the result of the preceding step the sum of all pending orders for said item from customers which have not yet been fulfilled;

subtracting from the result of the preceding step an estimate of the internal demand within said company for said item to determine a reaction capacity; and for each item j in said plurality of items, if said reaction capacity for item j is less than said minimum reaction capacity for item j and said current control date, and if said current control date belongs to said set of control dates chosen to correspond to item j, initiating a resupply process for said item.

7. A method for controlling inventory resupply processes in a company by means of a computerized production controller, where said company stocks a plurality of items at a set of locations, said set of locations comprising factories, warehouses, and points of sale controlled by said company, where said inventory resupply processes comprise purchasing items from outside suppliers, transporting items from one location to another, and manufacturing items from other items, where time is divided into a plurality of time periods called system periods, where the start of each system period in said plurality of time periods is called a control date, and where for each item j in said plurality of items a set of control dates corresponding to item j is chosen, said method comprising the steps, performed at a current control date, of:

identifying a time horizon called a planning period beginning at said current control date;

computing for each item j in said plurality of items and for said current control date and each future control date i in said planning period a minimum reaction capacity for item j on said control date i and a maximum reaction capacity for item j on said control date i;

computing for each item j in said plurality of items a current reaction capacity, said current reaction capacity being indicative of the ability of the inventory of item j to react to demand;

for each item j in said plurality of items, if said reaction capacity for item j is less than said minimum reaction cpacity for item j and said current control date, and if said current control date belongs to said set of control dates chosen to correspond to item j, initiating a resupply process for said item; and determining, for each pair of items j and k, the number $r_{jk}$ of units of item j required by a resupply process for each unit of item k supplied by said resupply process, said number $r_{jk}$ equalling 1 if items j and k are physically identical but stored at different locations in said set of locations, said number $r_{jk}$ equalling 0 if item k is bought from an outside supplier.

8. A method for controlling inventory resupply processes in a company by means of a computerized production controller, where said company stocks a plurality of items at a set of locations, said set of locations comprising factories, warehouses, and points of sale controlled by said company, where said inventory resupply processes comprise purchasing items from outside suppliers, transporting items from one location to another, and manufacturing items from other items, where time is divided into a plurality of time periods called system periods, where the start of each system period in said plurality of time periods is called a control date, where for each item j in said plurality of items a set of control dates corresponding to item j is chosen, said method comprising the steps, performed at a current control date, of;

identifying a time horizon called a planning period beginning at said current control date;

computing for each item j in said plurality of items and for said current control date and each future control date i in said planning period a minimum reaction capacity for item j on said control date i and a maximum reaction capacity for item j on said control date i;

computing for each item j in said plurality of items a current reaction capacity, said current reaction capacity being indicative of the ability of the inventory of item j to react to demand;

for each item j in said plurality of items, if said reaction capacity for item j is less than said minimum reaction cpacity for item j and said current control date, and if said current control date belongs to said set of control dates chosen to correspond to item j, initiating a resupply process for said item; and where said maximum reaction capacity for item j at control date i is computed as a function of said minimum reaction capacity for item j at control date i and a replacement batch size for item j when item j has a replacement batch size assigned to it.

9. A method for controlling inventory resupply processes in a company by means of a computerized production controller, where said company stocks a plurality of items at a set of locations, said set of locations comprising factories, warehouses, and points of sale controlled by said company, where said inventory resupply processes comprise purchasing items from outside suppliers, transporting items from one location to another, and manufacturing items from other items, where time is divided into a plurality of time periods called system periods, where the start of each system period in said plurality of time periods is called a control date, where for each item j in said plurality of items a set of control dates corresponding to item j is chosen, said method comprising the steps, performed at a current control date, of:

identifying a time horizon called a planning period beginning at said current control date;

computing for each item j in said plurality of items and for said current control date and each future control date i in said planning period a minimum reaction capacity for item j on said control date i and a maximum reaction capacity for item j on said control date i;

computing for each item j in said plurality of items a current reaction capacity, said current reaction capacity being indicative of the ability of the inventory of item j to react to demand;

for each item j in said plurality of items, if said reaction capacity for item j is less than said minimum reaction capacity for item j and said current control date, and if said current control date belongs to said set of control dates chosen to correspond to item j, initiating a resupply process for said item; and where each item j has an associated integral number of system periods called a control period $CP_j$, and where said control dates for item j are separated by $CP_j$ system periods.

10. A method for controlling inventory resupply processes in a company by means of a computerized production controller, where said company stocks a plurality of items at a set of locations, said set of locations comprising factories, warehouses, and points of sale controlled by said company, where said inventory resupply processes comprise purchasing items from outside suppliers, transporting items from one location to another, and manufacturing items from other items, where time is divided into a plurality of time periods called system periods, where the start of each system period in said plurality of time periods is called a control date, where for each item j in said plurality of items a set of control dates corresponding to item j is chosen, said method comprising the steps, performed at a current control date, of:

identifying a time horizon called a planning period beginning at said current control date;

computing for each item j in said plurality of items and for said current control date and each future control date i in said planning period a minimum reaction capacity for item j on said control date i and a maximum reaction capacity for item j on said control date i;

computing for each item j in said plurality of items a current reaction capacity, said current reaction capacity being indicative of the ability of the inventory of item j to react to demand;

for each item j in said plurality of items, if said reaction capacity for item j is less than said minimum reaction capacity for item j and said current control date, and if said current control date belongs to said set of control dates chosen to correspond to item j, initiating a resupply process for said item; and where said step of initiating a resupply process for item j further comprises the steps of:

determining an amount of item j to be obtained by means of said resupply process as the difference between said maximum reaction capacity for item j and said current control date and said current reaction capacity; and if item j has a replacement batch size assigned to it, truncating the result of the preceding step down to an integral multiple of said replacement batch size.

11. A method for controlling inventory resupply processes in a company by means of a computerized production controller, where said company stocks a plurality of items at a set of locations, said set of locations comprising factories, warehouses, and points of sale controlled by said company, where said inventory resupply processes comprise purchasing items from outside suppliers, transporting items from one location to another, and manufacturing items from other items, where time is divided into a plurality of time periods called system periods, where the start of each system period in said plurality of time periods is called a control date, where for each item j in said plurality of items a set of control dates corresponding to item j is chosen, said method comprising the steps, performed at a current control date, of:

identifying a time horizon called a planning period beginning at said current control date;

computing for each item j in said plurality of items and for said current control date and each future control date i in said planning period a minimum reaction capacity for item j on said control date i and a maximum reaction capacity for item j on said control date i;

computing for each item j in said plurality of items a current reaction capacity, said current reaction capacity being indicative of the ability of the inventory of item j to react to demand;

for each item j in said plurality of items, if said reaction capacity for item j is less than said minimum reaction capacity for item j and said current control date, and if said current control date belongs to said set of control dates chosen to correspond to item j, initiating a resupply process for said item;

where said step of initiating a resupply process for item j further comprises the step, performed for each item k in said plurality of items which is used as a component of said item, of removing from the physical inventory of said item k a number of units of said item k necessary to supply an amount of item j to be obtained by means of said resupply process.

12. A method for controlling inventory resupply processes in a company by means of a computerized production controller, where said company stocks a plurality of items at a set of locations, said set of locations comprising factories, warehouses, and points of sale controlled by said company, where said inventory resupply processes comprise purchasing items from outside suppliers, transporting items from one location to another, and manufacturing items from other items, where time is divided into a plurality of time periods called system periods, where the start of each system period in said plurality of time periods is called a control date, where for each item j in said plurality of items a set of control dates corresponding to item j is chosen, said method comprising the steps, performed at a current control date, of:

identifying a time horizon called a planning period beginning at said current control date;

computing for each item j in said plurality of items and for said current control date and each future control date i in said planning period a minimum reaction capacity for item j on said control date i and a maximum reaction capacity for item j on said control date i;

computing for each item j in said plurality of items a current reaction capacity, said current reaction capacity being indicative of the ability of the inventory of item j to react to demand;

for each item j in said plurality of items, if said reaction capacity for item j is less than said minimum reaction capacity for item j and said current control date, and if said current control date belongs to said set of control dates chosen to correspond to item j, initiating a resupply process for said item; and where said reaction time for item j is equal to the sum of an estimate, called a replacement period, of the time which would elapse between detection of a need for a resupply process for item j and the placement in inventory of new supplies of item j as a result of said resupply process, and a time interval between two successive control dates corresponding to item j.

13. The method of claim 12, where said replacement period is computed by means of a process comprising the steps of:

selecting a plurality of historical times at which a resupply process for item j was initiated, for each historical time in said plurality of historical times, determining the amount of time which elapsed between detection of a need for a resupply process for item j at said historical time and the placement in inventory of new supplies of item j as a result of said resupply process, computing said replacement period as the average of said elapsed amounts of time determined in the preceding step.

14. A method for controlling inventory resupply processes in a company by means of a computerized production controller, where said company stocks a plurality of items at a set of locations, said set of locations comprising factories, warehouses, and points of sale controlled by said company, where said inventory resupply processes comprise purchasing items from outside suppliers, transporting items from one location to another, and manufacturing items from other items, where time is divided into a plurality of time periods called system periods, where the start of each system period in said plurality of time periods is called a control date, where for each item j in said plurality of items a set of control dates corresponding to item j is chosen, said method comprising the steps, performed at a current control date, of:

identifying a time horizon called a planning period beginning at said current control date;

computing for each item j in said plurality of items and for said current control date and each future control date i in said planning period a minimum reaction capacity for item j on said control date i and a maximum reaction capacity for item i on said control date i;

computing for each item j in said plurality of items a current reaction capacity, said current reaction capacity being indicative of the ability of the inventory of item j to react to demand;

for each item j in said plurality of items, if said reaction capacity for item j is less than said minimum reaction capacity for item j and said current control date, and if said current control date belongs to said set of control dates chosen to correspond to item j, initiating a resupply process for said item; and where said step of computing a current reaction capacity for item j further comprises the steps of:

determining the amount of physical inventory of item j on hand; computing the sum of said physical inventory and the sum of all current pending orders for additional supplies of item j which have not yet arrived; subtracting from the result of the preceding step the sum of all current pending orders for item j from customers which have not yet been fulfilled; and subtracting from the result of the preceding step an estimate of the internal demand from within said company for item j.

15. The method of claim 14, where said step of computing a current reaction capacity for item j further comprises the steps of:

determining a set of items k consisting of all items k which are used as components in a resupply process for item j;

for each item k in said set of items:

determining a number of units of item k required for each unit of item j when item k is used as a component in a resupply process for item j, and multiplying said number of units by an estimate of a desired increase in the inventory of said item k at said current control date, and computing said estimate of the internal demand from within said company for item j as the sum of the products computed in said multiplying step.

16. The method of claim 15, where said estimate of a desired increase in the inventory of item j is the difference between said maximum reaction capacity for item j and said current control date, and said current reaction capacity for item j.

17. The method of claim 15, where said step of computing a current reaction capacity for item j further comprises the step of selecting an order for the items in said plurality of items such that in said order every item l appears later than any item k such that item l is used as a component in a resupply process for item k, where said steps of determining a number of units of item k required for each unit of item j and multiplying said number of units by an estimate are performed taking the items k in said order.

18. A method for controlling inventory resupply processes in a company by means of a computerized production controller, where said company stocks a plurality of items at a set of locations, said set of locations comprising factories, warehouses, and points of sale controlled by said company, where said inventory resupply processes comprise purchasing items from outside suppliers, transporting items from one location to another, and manufacturing items from other items, where time is divided into a plurality of time periods called system periods, where the start of each system period in said plurality of time periods is called a control date, where for each item j in said plurality of items a set of control dates corresponding to item j is chosen, said method comprising the steps, performed at a current control date, of:

identifying a time horizon called a planning period beginning at said current control date;

computing for each item j in said plurality of items and for said current control date and each future control date i in said planning period a minimum reaction capacity for item j on said control date i and a maximum reaction capacity for item j on said control date i;

computing for each item j in said plurality of items a current reaction capacity, said current reaction capacity being indicative of the ability of the inventory of item j to react to demand;

for each item j in said plurality of items, if said reaction capacity for item j is less than said minimum reaction capacity for item j and said current control date, and if said current control date belongs to said set of control dates chosen to correspond to item j, initiating a resupply process for said item, said minimum reaction capacity for item j on said control date i being computed as a function of:

a forecast of demand for item j during a time period beginning at control date i and having duration equal to a reaction time corresponding to item j, said reaction time corresponding to item j being an estimate of the amount of time which would elapse between (i) the occurrence of a difference between real and forecast demand such that a resupply process for item j should be initiated and (ii) the arrival of a new supply of item j to compensate for said difference; and a safety stock for item j on said control date i.

19. The method of claim 18, where said step of computing for each item j and for said current control date and each future control date i in said planning period a minimum reaction capacity comprises the steps, performed for each item j in said plurality of items, of:

for each system period p in said planning period, computing a forecast of customer demand for item j during system period p, said forecast equalling zero if item j is not sold to customers;

for each system period p in said planning period, computing a forecast of the increase in the internal demand from within said company received for item j during system period p;

for each system period p in said planning period, computing an estimate of the total demand for item j during system period p as the sum of the forecasts computed in the preceding two steps; and for each control date i in said planning period, computing a forecast of the expected demand for item j during the time interval beginning with control date i and having a duration equal to said reaction time corresponding to item j as the sum of said estimates of the total demand for item j during system periods p within said time interval.

20. The method of claim 19, where said step of computing a forecast of the increase in the internal demand from within said company received for item j during system period p comprises the steps of:

determining a second set of items k consisting of all items k such that item j is used as a component in a resupply process for item k;

for each item k, if any, in said second set of items;

determining the number of units of said item j required for each unit of item k when item j is used as a component in a resupply process for item k;

multiplying said number of units by a forecast of the increase in the internal demand from within said company emitted by item k during system period p;

computing said forecast of the increase in the internal demand from within said company received for item j during system period p as the sum of the products computed in said multiplying step.

21. The method of claim 19, where said step of computing a forecast of customer demand for item j during system period p is performed by means of well known methods in the art of inventory and production planning.

22. The method of claim 21, where said forecast of the increase in the internal demand from within said company emitted by item k during system period p is computed as the sum of total forecast demand for item k during said system period p plus the difference between said maximum reaction capacity for item k at the control date i+1 which immediately follows system period p and the maximum reaction capacity for item k at the control date i which immediately precedes system period p.

23. The method of claim 21, further comprising the step of selecting an order for the items in said plurality of items such that in said order every item l appears later than any item k such that item l is used as a component in a resupply process for item k, and where determining the number of units of said item j required for each unit of item k and multiplying said number of units by a forecast are performed taking the items k in said order.

24. A method for controlling inventory resupply processes using a computerized production controller, said method comprising the steps of:

determining a reaction capacity responsive to the sum of physical inventory and the sum of all pending orders for additional supplies of said item which have not yet arrived, less the sum of all pending orders for said item from customers which have not yet been fulfilled less an estimate of the internal demand within said company for said item; and initiating a resupply process for said item when said reaction capacity of inventory is less than a predetermined minimum, and suspending the resupply process for said item of inventory when said reaction capacity is greater than a predetermined maximum.

25. A method for controlling inventory resupply process according to claim 24, wherein said reaction capacity defines units and orders available in the resupply process which said item may have at any particular moment in order to react potentially to meet expected demands.

26. A method for controlling inventory resupply processes according to claim 24, wherein said reaction capacity is estimatable at any moment and, optionally at least one of before and after a command replacement.

27. A method for controlling inventory resupply processes according to claim 24, wherein said reaction capacity indicates a real potential value available of said item that exists at a particular moment.

* * * * *

UNITED STATES PATENT AND TRADEMARK OFFICE
CERTIFICATE OF CORRECTION

PATENT NO. : 5,991,732
DATED : November 23, 1999
INVENTOR(S) : Andrés Monedero

It is certified that error appears in the above-identified patent and that said Letters Patent is hereby corrected as shown below:

In the [76] Inventors: section of the printed patent, please change the name of the inventor from Andres Monedero Moslares:

Inventor:  Andrés Monedero
Rbla Jardí 12-14, 08190 San Cugat del Vallés, Barcelona, Spain Signed and Sealed this Twenty-fourth Day of April, 2001

Attest:

NICHOLAS P. GODICI

*Attesting Officer*  *Acting Director of the United States Patent and Trademark Office*